US009608278B2

(12) United States Patent
Hayden et al.

(10) Patent No.: US 9,608,278 B2
(45) Date of Patent: Mar. 28, 2017

(54) MIXED METAL OXIDE MATERIAL OF TIN AND TITANIUM

(71) Applicant: Ilika Technologies, Ltd., Chilworth, Southampton Hampshire (GB)

(72) Inventors: Brian Elliott Hayden, Southampton (GB); Jonathan Conrad Davies, Southampton (GB); Laura Jane Offin, Southampton (GB)

(73) Assignee: Ilika Technologies, Ltd., Southampton Hampshire (GB)

( * ) Notice: Subject to any disclaimer, the term of this patent is extended or adjusted under 35 U.S.C. 154(b) by 0 days.

(21) Appl. No.: 14/653,047

(22) PCT Filed: Jan. 16, 2014

(86) PCT No.: PCT/GB2014/050118
§ 371 (c)(1),
(2) Date: Jun. 17, 2015

(87) PCT Pub. No.: WO2014/111714
PCT Pub. Date: Jul. 24, 2014

(65) Prior Publication Data
US 2015/0333338 A1 Nov. 19, 2015

(30) Foreign Application Priority Data

Jan. 16, 2013 (GB) .................................. 1300810.7

(51) Int. Cl.
*H01M 4/02* (2006.01)
*H01M 4/92* (2006.01)
*H01M 4/90* (2006.01)
*H01M 4/88* (2006.01)
*C01G 23/00* (2006.01)
*C01G 23/07* (2006.01)
*B82Y 30/00* (2011.01)

(52) U.S. Cl.
CPC ............ *H01M 4/921* (2013.01); *B82Y 30/00* (2013.01); *C01G 23/00* (2013.01); *C01G 23/07* (2013.01); *H01M 4/8825* (2013.01); *H01M 4/9016* (2013.01); *H01M 4/925* (2013.01); *C01P 2002/30* (2013.01); *C01P 2002/50* (2013.01); *C01P 2002/72* (2013.01); *C01P 2004/04* (2013.01); *C01P 2004/64* (2013.01); *C01P 2004/80* (2013.01); *C01P 2006/40* (2013.01)

(58) Field of Classification Search
CPC . B01J 23/42; B01J 32/00; C01G 35/00; C01P 2002/54; H01M 4/8825; H01M 4/9075; H01M 4/925; Y02E 60/50
IPC .................................................. C01P 2002/54
See application file for complete search history.

(56) References Cited

U.S. PATENT DOCUMENTS

| 5,723,404 | A | 3/1998 | Bütje et al. |
| 6,783,569 | B2 | 8/2004 | Cheon et al. |
| 7,053,021 | B1 | 5/2006 | Zhong et al. |
| 7,704,918 | B2 | 4/2010 | Adzic et al. |
| 7,855,021 | B2 | 12/2010 | Adzic et al. |
| 2005/0085379 | A1 | 4/2005 | Ishihara et al. |
| 2006/0263675 | A1 | 11/2006 | Adzic et al. |
| 2007/0026292 | A1 | 2/2007 | Adzic et al. |
| 2007/0031722 | A1 | 2/2007 | Adzic et al. |
| 2007/0037041 | A1 | 2/2007 | Cai et al. |
| 2007/0082257 | A1 | 4/2007 | Tamura et al. |
| 2007/0105005 | A1 | 5/2007 | Tolmachev |
| 2007/0264492 | A1 | 11/2007 | Mizuno et al. |
| 2008/0008924 | A1 | 1/2008 | Xiong et al. |
| 2008/0220296 | A1 | 9/2008 | Eichhorn et al. |
| 2009/0065738 | A1 | 3/2009 | Weidner et al. |
| 2009/0114061 | A1 | 5/2009 | Strasser et al. |
| 2009/0117257 | A1 | 5/2009 | Monnier et al. |
| 2010/0105548 | A1 | 4/2010 | Zhang et al. |
| 2010/0197490 | A1 | 8/2010 | Adzic et al. |
| 2012/0122019 | A1* | 5/2012 | DiSalvo, Jr. ........... B82Y 30/00 429/524 |
| 2012/0202683 | A1* | 8/2012 | Shirvanian ............... B01J 23/42 502/339 |
| 2012/0309615 | A1 | 12/2012 | Shao et al. |
| 2013/0022899 | A1 | 1/2013 | Arai et al. |
| 2013/0136687 | A1 | 5/2013 | Darr et al. |
| 2015/0333337 | A1 | 11/2015 | Hayden et al. |
| 2015/0372316 | A1 | 12/2015 | Hayden et al. |

FOREIGN PATENT DOCUMENTS

CN 101455970 A 6/2009
EP 1 524 711 4/2005
(Continued)

OTHER PUBLICATIONS

Carotta, M.C., et al., "(Ti, Sn)O$_2$ Solid Solutions for Gas Sensing: A Systematic Approach by Different Techniques for Different Calcination Temperature and Molar Composition", *Sensors and Actuators*, vol. 139 (2009), pp. 329-339.
Wang, Y-J., et al., "Noncarbon Support Materials for Polymer Electrolyte Membrane Fuel Cell Electrocatalysts", *Chemical Reviews*, vol. 111, (Sep. 2011), pp. 7625-7651.
International Search Report for PCT/GB2014/050118, dated Apr. 15, 2014.
Antolini, E., et al., "Ceramic Materials as Supports for Low-Temperature Fuel Cell Catalysts", *Solid State Ionics*, vol. 180 (2009), pp. 746-763.
(Continued)

*Primary Examiner* — Patrick Ryan
*Assistant Examiner* — Ben Lewis
(74) *Attorney, Agent, or Firm* — Brinks Gilson & Lione

(57) ABSTRACT

A mixed metal oxide material of tin and titanium is provided for use in a fuel cell. The mixed metal oxide may form the core of a core-shell composite material, used as a catalyst support, in which a catalyst such as platinum forms the shell. The catalyst may be applied as a single monolayer, or up to 20 monolayers.

35 Claims, 15 Drawing Sheets

(56) References Cited

FOREIGN PATENT DOCUMENTS

| EP | 1 859 861 A1 | 11/2007 |
|---|---|---|
| EP | 1 925 592 | 5/2008 |
| EP | 2 557 203 | 2/2013 |
| JP | 2000-237588 | 9/2000 |
| JP | 2005-013946 | 1/2005 |
| JP | 2005-100713 | 4/2005 |
| JP | 4552098 | 7/2010 |
| WO | WO 99/56872 | 11/1999 |
| WO | WO2008/025751 | 3/2008 |
| WO | WO2009/041543 | 4/2009 |
| WO | WO 2009/041543 | 4/2009 |
| WO | WO2009/152003 | 12/2009 |
| WO | WO 2009/157033 | 12/2009 |
| WO | WO 2010/005773 | 1/2010 |
| WO | WO 2010/135576 | 11/2010 |
| WO | WO 2011/065471 | 6/2011 |
| WO | WO 2012/041340 | 4/2012 |
| WO | WO 2012/105978 | 8/2012 |
| WO | WO 2012/125138 | 9/2012 |
| WO | WO 2012/144974 | 10/2012 |
| WO | WO2013/013704 | 1/2013 |

OTHER PUBLICATIONS

Batzill, M., et al., "The Surface and Materials Science of Tin Oxide", *Progress in Surface Science*, vol. 79 (2005), pp. 47-154.
Carotta, M.C., et al., "(Ti, Sn)$O_2$ Solid Solutions for Gas Sensing: A Systemic Approach by Different Techniques for Different Calcination Temperature and Molar Composition", *Sensors and Actuators B: Chemical*, vol. 139, No. 2 (2009), pp. 329-339.
Chen,Y., et al., "Atomic Layer Deposition Assisted Pt—$SnO_2$ Hybrid Catalysts on Nitrogen-Doped CNTs with Enhanced Electrocatalytic Activities for Low Temperature Fuel Cells", *International Journal of Hydrogen Energy*, vol. 36 (2011), pp. 11085-11092.
Cui, X., et al., "Graphitized Mesoporous Carbon Supported Pt—$SnO_2$ Nanoparticles as a Catalyst for Methanol Oxidation", *Fuel*, vol. 89 (2010), pp. 372-377.
De Bruijn, F.A., et al., "Review: Durability and Degradation Issues of PEM Fuel Cell Components", *Fuel Cells*, vol. 8, No. 1 (2008), pp. 3-22.
Gasteiger, H.A., et al., "Activity Benchmarks and Requirements for Pt, Pt-alloy, and non-Pt Oxygen Reduction Catalysts for PEMFCs", *Applied Catalysis B: Environmental*, vol. 56 (2005), pp. 9-35.
Guerin, S., et al., "Physical Vapor Deposition Method for the High-Throughput Synthesis of Solid-State Material Libraries", *J. Comb. Chem.*, vol. 8 (2006), pp. 66-73.
Guerin, S., et al., "Combinatorial Electrochemical Screening of Fuel Cell Electrocatalysts", *J. Comb. Chem.*, vol. 6 (2004), pp. 149-158.
Guerin, S., et al., "High-Throughput Synthesis and Screening of Ternary Metal Alloys for Electrocatalysis", *J. Phys. Chem. B*, vol. 110 (2006), pp. 14355-14362.
Guo, D-J., et al., "Highly Catalytic Activity of Pt Electrocatalyst Supported on Sulphated $SnO2$/multi-walled Carbon Nanotube Composites for Methanol Electro-Oxidation", *Journal of Power Sources*, vol. 198 (2012), pp. 127-131.
Hartl, K., et al., "AuPt Core-shell Nanocatalysts with Bulk Pt Activity", *Electrochemistry Communications*, vol. 12 (2010), pp. 1487-1489.
Hayden, B.E., et al., "The Influence of Pt Particle Size on the Surface Oxidation of Titania Supported Platinum", *Physical Chemistry Chemical Physics*, vol. 11 (2009), pp. 1564-1570.
Hayden, B.E., et al., "The influence of Support and Particle Size on the Platinum Catalysed Oxygen Reduction Reaction", *Physical Chemistry Chemical Physics*, vol. 11 (2009), pp. 9141-9148.
Huang, S-Y., et al., "Electrocatalytic Activity and Stability of Niobium-Doped Titanium Oxide Supported Platinum Catalyst for Polymer Electrolyte Membrane Fuel Cells", *Applied Catalysis B: Environmental*, vol. 96 (2010), pp. 224-231.
Huang, S-Y., et al., "Development of a Titanium Dioxide-Supported Platinum Catalyst with Ultrahigh Stability for Polymer Electrolyte Membrane Fuel Cell Applications", *J. Am., Chem. Soc.*, vol. 131 (2009), pp. 13898-13899.
International Centre for Diffraction Database No. 00-41-1445 (Aug. 18, 2015).
Ma, Y., et al. "High Active PtAu/C Catalyst with Core-Shell Structure for Oxygen Reduction Reaction", *Catalysis Communications*, vol. 11 (2010), pp. 434-437.
Peuckert, M., et al., "Oxygen Reduction on Small Supported Platinum Particles", *Journal of the Electrochemical Society*, vol. 133, No. 5 (1986), pp. 944-947.
Sasaki, K., et al., "Core-Protected Platinum Monolayer Shell High-Stability Electrocatalysts for Fuel-Cell Cathodes", *Angewandte Chemie International Edition*, vol. 49, No. 46, (2010), pp. 8602-8607.
Silva, J.C.M., et al., "Ethanol Oxidation Reactions Using $SnO_2$@Pt/C as an Electrocatalyst", *Applied Catalysis B: Environmental*, vol. 99 (2010), pp. 265-271.
Wang, R., et al., "Carbon Supported Pt-Shell Modified PdCo-core with Electrocatalyst for Methanol Oxidation", *International Journal of Hydrogen Energy*, vol. 35 (2010), pp. 10081-10086.
Wang, R., et al., "Preparation of Carbon-Supported Core@shell PdCu@PtRu Nanoparticles for Methanol Oxidation", *Journal of Power Sources*, vol. 195 (2010), pp. 1099-1102.
Wang, S., et al., "Controlled Synthesis of Dendritic Au@Pt Core-shell Nanomaterials for Use as an Effective Fuel Cell Electrocatalyst", *Nanotechnology*, vol. 20. No. 2 (2009), 025605 (9 pages).
Wang, W., et al., "Pt Overgrowth on Carbon Supported PdFe Seeds in the Preparation of Core-shell Electrocatalysts for the Oxygen Reduction Reaction", *Journal of Power Sources*, vol. 195 (2010), pp. 3498-3503.
Wang, Y-J., et al., "Noncarbon Support Materials for Polymer Electrolyte Membrane Fuel Cell Electrocatalysts", *Chemical Reviews*, vol. 111, No. 12 (2011), pp. 7625-7651.
Wei, Z.D., et al. "Electrochemically Synthesized Cu/Pt Core-shell Catalysts on a Porous Carbon Electrode for Polymer Electrolyte Membrane Fuel Cells", *Journal of Power Sources*, vol. 180 (2008), pp. 84-91.
Wu, Y-N., et al., "High-Performance Core-shell PdPt@Pt/C Catalysts via Decorating PdPt Alloy Cores with Pt", *Journal of Power Sources*, vol. 194 (2009), pp. 805-810.
Xu, Z., et al., "Effect of Particle Size on the Activity and Durability of the Pt/C Electrocatalyst for Proton Exchange Membrane Fuel Cells", *Applied Catalysis B: Environmental*, vol. 111-112 (2012), pp. 264-270.
Ye, J., et al., "Preparation of Pt Supported on $WO_3$—C with Enhanced Catalytic Activity by Microwave-Pyrolysis Method", *Journal of Power Sources*, vol. 195 (2010), pp. 2633-2637.
International Preliminary Report on Patentability for PCT/GB2014/050118, dated Jul. 21, 2015.
Du, Q., et al., "Pt@Nb—$TiO_2$ Catalyst Membranes Fabricated by Electrospinning Atomic Layer Deposition", *ACS Catal.*, vol. 4 (2014), pp. 144-151.
Liu, M., et al., "PdAg Nanorings Supported on Graphene Nanosheets: Highly Methanol-Tolerant Cathode Electrocatalyst for Alkaline Fuel Cells", *Adv. Funct. Mater.*, vol. 23 (2013), pp. 1289-1296.
Garsany, Y., "Experimental Methods for Quantifying the Activity of Platinum Electrocatalysts for the Oxygen Reduction Reaction", *Anal. Chem.*, vol. 82 (2010), pp. 6321-6328.
Nguyen, S.T., et al., "Ethanol Electro-Oxidation Activity of Nb-doped-$TiO_2$ Supported PdAg Catalysts in Alkaline Media", *Applied Catalysis B: Environmental*, vol. 113-114 (2012), pp. 261-270.
Choi, I., et al., "Preparation of $Pt_{shell}$—$Pd_{core}$ Nanoparticle with Electroless Deposition of Copper for Polymer Electrolyte Membrane Fuel Cell", *Applied Catalysis B: Environmental*, vol. 102 (2011), pp. 608-613.
Karim, N.A., et al., "An Overview on Non-Platinum Cathode Catalysts for Direct Methanol Fuel Cell", *Applied Energy*, vol. 103 (2013), pp. 212-220.

(56) References Cited

OTHER PUBLICATIONS

Pernstich, K.P., et al., "Electroless Plating of Ultrathin Films and Mirrors of Platinum Nanoparticles onto Polymers, Metals, and Ceramics", *Applied Materials & Interfaces*, vol. 2, No. 3 (2010), pp. 639-643.

Imai, H., et al., "Structural Defects Working as Active Oxygen-Reduction Sites in Partially Oxidized Ta-Carbonitride Core-Shell Particles Probes by Using Surface-Sensitive Conversion-Electron-Yield X-ray Absorption Spectroscopy", *Applied Physics Letters*, vol. 96 (2010), pp. 191905-1 to 191905-3.

Nava, N., et al., "Tin-Platinum Catalysts Interactions on Titania and Silica", *Applied Surface Science*, vol. 253 (2007), pp. 9215-9220.

Lee, J-M., et al., "$TiO_2$@carbon Core-Shell Nanostructure Supports for Platinum and Their Use for Methanol Electrooxidation", *Carbon*, vol. 48 (2010), pp. 2290-2296.

Shrestha, S., et al., "Electrocatalytic Activity and Stability of Pt Clusters on State-of-the-Art Supports: A Review", *Catalysis Reviews: Science and Engineering*, vol. 53 (2011), pp. 256-336.

Fresno, F., et al., "Synthesis of $Ti_{1-x}Sn_xO_2$ Nanosized Photocatalysts in Reverse Microemulsions", *Catalysis Today*, vol. 143 (2009), pp. 230-236.

Ji, J., et al., "Catalytic Activity of Core-Shell Structured $Cu/Fe_3O_4$@$SiO_2$ Microsphere Catalysts", *Catalysis Today*, vol. 158 (2010), pp. 305-309.

Yao, L., et al., "Core-Shell Structured Nickel and Ruthenium Nanoparticles: Very Active and Stable Catalysts for the Generation of $Co_x$-free Hydrogen Via Ammonia Decomposition", *Catalysis Today*, (2010), doi:10.1016/j.cattod.2010.10.056.

Chen, C.C., et al., "The Enhancement of Platinum Surface Area by Alumina Template Assistance in Sn/Pt Core-Shell Nano/sub-micron Sphere Structure", *Ceramics International*, vol. 39 (2013), pp. 4369-4375.

Kim, H-W., et al. "Preparation of Supported Ni Catalysts on Various Metal Oxides with Core/Shell Structures and their Tests for the Steam Reforming of Methane", *Chemical Engineering Journal*, (2010), doi:10.1016/j.cej.2010.11.045.

Meier, J., et al., "Nano-Scale Effects in Electrochemistry", *Chemical Physics Letters*, vol. 390 (2004), pp. 440-444.

Aaltonen, T., et al., "Atomic Layer Deposition of Platinum Thin Films", *Chem. Mater.*, vol. 15 (2003), pp. 1924-1928.

Aryanpour, M., et al., "Tungsten-Doped Titanium Dioxide in the Rutile Structure: Theoretical Considerations", *Chem. Mater.*, vol. 21 (2009), pp. 1627-1635.

Mackus, A.J.M., et al., "Influence of Oxygen Exposure on the Nucleation of Platinum Atomic Layer Deposition: Consequences for Film Growth, Nanopatterning, and Nanoparticle Synthesis", *Chem. Mater.*, vol. 25 (2013), pp. 1905-1911.

DOE Hydrogen and Fuel Cells Program, "V.E.1 Polymer Electrolyte Fuel Cell Lifetime Limitations: The Role of Electrocatalyst Degradation", FY 2011 Annual Progress Report, pp. 783-787.

DOE Hydrogen Program, "IV.C.3, Low Platinum Loading Catalysts for Fuel Cells", FY 2004 Progress Report, pp. 384-388.

Serov, A., et al., "Highly Active and Durable Templated Non-PGM Cathode Catalysts Derived from Iron and Aminoantipyrine", *Electrochemistry Communications*, vol. 22 (2012), pp. 53-56.

Li, W., et al., "Nano-Structured Pt-Fe/C as Cathode Catalysts in Direct Methanol Fuel Cell", *Electrochimica Acta*, Vo. 49 (2004), pp. 1045-1055.

Vukmirovic, M.B., et al. "Platinum Monolayer Electrocatalysts for Oxygen Reduction", *Electrochimica Acta*, vol. 52 (2007), pp. 2257-2263.

Mayrhofer, K.J.J., et al., "Measurement of Oxygen Reduction Activities via the Rotating Disc Electrode Method: From Pt Model Surfaces to Carbon-Supported High Surface Area Catalysts", *Electrochimica Acta*, vol. 53 (2008), pp. 3181-3188.

Ishihara, A., et al., "Progress in Non-Precious Metal Oxide-Based Cathode for Polymer Electrolyte Fuel Cells", *Electrochimica Acta*, vol. 55 (2010), pp. 8005-8012.

Takasu, Y., et al., "Oxygen Reduction Characteristics of Several Valve Metal Oxide Electrodes in $HCLO_4$ Solution", *Electrochimica Acta*, vol. 55 (2010), pp. 8220-8229.

Wieckowski, a., et al. (Editors), "Catalysis and Electrocatalysis at Nanoparticle Surfaces", *Nanomaterials as Precursors for Electrocatalysts*, (2003), Marcel Dekker, Inc., CRC Press, ISBN: 9780824708795, pp. 347 and 384-385.

Fuel Cell Technical Team, U.S. Drive Partnership, "Cell Component Accelerated Stress Test and Polarization Curve Protocols for Polymer Electrolyte Membrane Fuel Cells" (Electrocatalysts, Supports, Membranes, and Membrane Electrode Assemblies, (Revised Dec. 16, 2010), pp. 1-8.

Wagner, F.T., et al., "What Performance would Non-Pt Cathode Catalysts Need to Achieve to be Practical for Transportation? Or the Importance of $A/cm^3$", *Fuel Cell Activities*, DOE Workshop on Non-Platinum Electrocatalysts, General Motors, (Mar. 21-22, 2003), New Orleans, LA.

Fuel Cell Handbook, (Seventh Edition), by EG&G Technical Services, Inc., U.S. Department of Energy, Office of Fossil Energy, Morgantown, WV (Nov. 2004).

Jiang, L., et al., "Highly Active Core-Shell $PtSnO_x$ Nanocatalyst: Synthesis, Characterization and Performance as Anode Catalysts for Direct Alcohol Fuel Cell", Direct Methanol Fuel Cell Laboratory, Dalian Inst. of Chemical Physics, Dalian, China.

Adzic, R., et al., "Metal and Metal Oxide-Supported Platinum Monolayer Electrocatalysts for Oxygen Reduction", Brookhaven National Laboratory, Upton, NY, FY 2013 Annual Progress Report, DOE Hydrogen and Fuel Cells Program.

Chattopadhyay, J., et al., "Performance of Tin Doped Titania Hollow Spheres as Electrocatalysts for Hydrogen and Oxygen Production in Water Electrolysis", *International Journal of Hydrogen Energy*, vol. 33 (2008), pp. 3270-3280.

Kwak, B.S., et al., "Hydrogen Production from Ethanol Steam Reforming over Core-Shell Structured $Ni_xO_y$—, $Fe_xO_y$—, and $Co_xO_{y-Pd\ catalysts}$", *International Journal of Hydrogen Energy*, vol. 35 (2010), pp. 11829-11843.

Yang, X., et al., "Carbon-Supported $Ni_{1-x}$@$Pt_x$ (x=0.32, 0.43, 0.60, 0.67, and 0.80) Core-Shell Nanoparticles as Catalysts for Hydrogen Generation from Hydrolysis of Ammonia Borane", *International Journal of Hydrogen Energy*, vol. 36 (2011), pp. 1984-1990.

Kim, J.Y., et al., "A Novel Non-Platinum Group Electrocatalyst for PEM Fuel Cell Application", *International Journal of Hydrogen Energy*, vol. 36 (2011), pp. 4557-4564.

Vasić, D.D., et al., "DFT Study of Platinum and Palladium Overlayers on Tungsten Carbide: Structure and Electrocatalytic Activity Toward Hydrogen Oxidation/Evolution Reaction", *International Journal of Hydrogen Energy*, vol. 38 (2013), pp. 5009-5018.

Guillén-Villafuerte, O, et al., "Preliminary Studies of the Electrochemical Performance of Pt/X@$MoO_3$/C (X=$Mo_2C$, $MoO_2$, $Mo^0$) Catalysts for the Anode of a DMFC: Influence of the Pt Loading and Mo-phase", *International Journal of Hydrogen Energy*, vol. 38 (2013), pp. 7811-7821.

Reyes-Rodriguez, J.L., et al., "RRDE Study on Co@Pt/C Core-Shell Nanocatalysts for the Oxygen Reduction Reaction", *International Journal of Hydrogen Energy*, vol. 38 (2013), pp. 12634-12639.

Wang, R., et al, "Heterostructure Core PdSn—$SnO_2$ Decorated by Pt as Efficient Electrocatalysts for Ethanol Oxidation", *International Journal of Hydrogen Energy*, vol. 38 (2013), pp. 13604-13610.

Sánchez-Padilla, N.M., et al., "Fast Synthesis and Electrocatalytic Activity of M@Pt (M—Ru, $Fe_3O_4$, Pd) Core-Shell Nanostructures for the Oxidation of Ethanol and Methanol", *International Journal of Hydrogen Energy*, (Nov. 3, 2012), http://dx.doi.org/10.1016/j.ijhydene.2012.11.026.

Choi, I., et al., "Synthesis of an Active and Stable $Pt_{shell}$—$Pd_{core}$/C Catalyst for the Electro-Oxidation of Methanol", *International Journal of Hyprodgen Energy*, vol. 39 (2014), pp. 3681-3689.

Matin, MD. A., et al. "One-Pot Sonication-Assisted Polyol Synthesis of Trimetallic Core-shell (Pd, Co)@Pt Nanoparticles for Enhanced Electrocatalysis", *International Journal of Hydrogen Energy*, vol. 39 (2014), pp. 3710-3718.

(56) References Cited

OTHER PUBLICATIONS

Sun, X., et al., "Core/Shell Au/CuPt Nanoparticles and Their Dual Electrocatalysis for Both Reduction and Oxidation Reactions", *Journal of the American Chemical Society*, vol. 136 (2014), pp. 5745-5749.

Ahluwalia, R.K., et al., "Dynamics of Particle Growth and Electrochemical Surface Area Loss due to Platinum Dissolution", *Journal of the Electrochemical Society*, vol. 161, No. 3 (2014), pp. F291-F304.

Rezaei, M., et al. "Electrochemical Nucleation and Growth of Pd/PdCo Core-Shell Nanoparticles with Enhanced Activity and Durability as Fuel Cell Catalyst", *Journals of Materials Chemistry A*, vol. 2 (2014), pp. 4588-4597.

Chen, S., et al., "Electrocatalysis under Conditions of High Mass Transport Rate: Oxygen Reduction on Single Submicrometer-Sized Pt Particles Supported on Carbon", *J. Phys. Chem. B*, vol. 108 (2004), pp. 3262-3276.

Zhang, J., et al., "Platinum Monolayer Electrocatalysts for $O_2$ Reduction: Pt Monolayer on Pd(111) and on Carbon-Supported Pd Nanoparticles", *J. Phys. Chem. B*, vol. 108 (2004), pp. 10955-10964.

Norskov, J.K., et al., "Origin of the Overpotential for Oxygen Reduction at a Fuel-Cell Cathode", *J. Phys. Chem. B*, vol. 108 (2004), pp. 17886-17892.

Zhang, J., et al., "Platinum Monolayer on Nonnoble Metal-Noble Metal Core-Shell Nanoparticle Electrocatalysts for $O_2$ Reduction", *J. Phys. Chem. B*, vol. 109, (2005), pp. 22701-22704.

Couselo, N., et al., "Tungsten-Doped $TiO_2$ vs Pure $TiO_2$ Photocatalysts: Effects on Photobleaching Kinetics and Mechanism", *J. Phys. Chem. C*, vol. 112 (2008), pp. 1094-1100.

Rinaldo, S.G., et al., "Physical Theory of Platinum Nanoparticle Dissolution in Polymer Electrolyte Fuel Cells", *J. Phys. Chem. C*, vol. 114 (2010), pp. 5773-5785.

Wang, X-L., et al., "$Sn/SnO_x$ Core-Shell Nanospheres: Synthesis, Anode Performance in Li Ion Batteries, and Superconductivity", *J. Phys. Chem. C.*, vol. 114 (2010), pp. 14697-14703.

Qi, D., et al., "Development of Core-Shell Structure $Fe_3O_4@Ta_2O_5$ Microspheres for Selective Enrichment of Phosphopeptides for Mass Spectrometry Analysis", *Journal of Chromatography A*, vol. 1216 (2009), pp. 5533-5539.

Wang, C-H., et al., "Iridium-Decorated Palladium-Platinum Core-Shell Catalysts for Oxygen Reduction Reaction in Proton Exchange Membrane Fuel Cell", *Journal of Colloid and Interface Science*, vol. 427 (2014), pp. 91-97.

Kokkinidis, G., et al, "Electroless Deposition of Pt on Ti. Part II. Catalytic Activity for Oxygen Reduction", *Journal of Electroanalytical Chemistry*, vol. 511 (2001), pp. 20-30.

Yeung, C.M.Y., et al., "Some Optimization in Preparing Core-Shell Pt-ceria Catalysts for Water Gas Shift Reaction", *Journal of Molecular Catalysis A: Chemical*, vol. 322 (2010), pp. 17-25.

Klaiber, T., "Fuel Cells for Transport: Can the Promise be Fulfilled? Technical Requirements and Demands from Customers", *Journal of Power Sources*, vol. 61 (1996), pp. 61-69.

Oh, T., et al., "Effects of Tungsten Oxide Addition on the Electrochemical Performance of Nanoscale Tantalum Oxide-Based Electrocatalysts for Proton Exchange Membrane (PEM) Fuel Cells", *Journal of Power Sources*, vol. 196 (2011), pp. 6099-6103.

Liu, Y-T., et al., "Electrochemical Activity and Stability of Core-Shell $Fe_2O_3$/Pt Nanoparticles for Methanol Oxidation", *Journal of Power Sources*, vol. 243 (2013), pp. 622-629.

Dang, D., et al., "A Pulse Electrochemical Deposition Method to Prepare Membrane Electrode Assemblies with Ultra-Low Anode Pt Loadings Through in situ Construction of Active Core-Shell Nanoparticles on an Electrode", *Journal of Power Sources*, vol. 260 (2014), pp. 27-33.

Koh, J-H., et al., "Design and Synthesis of Degradation-Resistant Core-Shell Catalysts for Proton Exchange Membrane Fuel Cells", *Journal of Power Sources*, vol. 261 (2014), pp. 271-277.

Rao, C.R.K., et al., "Electroless Deposition of Platinum on Titanium Substrates", *Materials Chemistry and Physics*, vol. 68 (2001), pp. 62-65.

Kim, D-Y., et al., "Core-Shell Nanostructure Supported Pt Catalyst with Improved Electrocatalytic Stability in Oxygen Reduction Reaction", *Materials Chemistry and Physics*, vol. 137 (2013), pp. 704-708.

Yang, H., et al., "Synthesis and Characterization of Tungsten Oxide-Doped Titania Nanocrystallites", *Materials Letters*, vol. 57 (2002), pp. 674-678.

Beard, K.D., et al., "Preparation and Structural Analysis of Carbon-Supported Co Core/Pt Shell Electrocatalysts Using Electroless Deposition Methods", *Nano*, vol. 3, No. 9 (2009), pp. 2841-2853.

Zheng, F., et al., "Facile Design of Au@Pt Core-Shell Nanostructures: Formation of Pt Submonolayers with Tunable Coverage and their Applications in Electrocatalysis", *Nano Research*, vol. 7, No. 3 (2014), pp. 410-417.

Li, G., et al., "Noble Metal Nanoparticle@metal Oxide Core/Yolk-Shell Nanostructures as Catalysts: Recent Progress and Perspective", *Nanoscale*, vol. 6, (2014), pp. 3995-4011.

Hsieh, Y-C., et al., "Ordered Bilayer Ruthenium-Platinum Core-Shell Nanoparticles as Carbon Monoxide-Tolerant Fuel Cell Catalysts", *Nature Communications*, DOI: 10.1038/ncomms3466.

Debe, M.K., "Electrocatalyst Approaches and Challenges for Automotive Fuel Cells", *Nature*, vol. 486 (Jun. 7, 2012), pp. 43-51.

Hwang, S.J., et al., "Supported Core@Shell Electrocatalysts for Fuel Cells: Close Encounter with Reality", www.nature.com/ScientificReports DOI: 10.1038/srep01309.

Jang, J-H., et al., "Rational Synthesis of Core-Shell Fex@Pt Nanoparticles for the Study of Electrocatalytic Oxygen Reduction Reaction", www.nature.com/ScientificReports DOI: 10.1038/srep02872.

Markovic et al., "Catalysis and Electrocatalysis at nanoparticle Surfaces", pp. 312-313.

Antoniadou, M, et al., "A Photoactiviated Fuel Cell Used as an Apparatus that Consumes Organic Wastes to Produce Activity", vol. 10 (2011), pp. 431-435. $6^{th}$ European Meeting on Solar Chemistry and Photocatalysis: Environmental Applications, Issue 3 (2011) *Photochemical & Photobiological Sciences*.

Schneider, A., et al., "Transport Effects in the Oxygen Reduction Reaction on Nanostructured, Planar Glassy Carbon Supported Pt/GC Model Electrodes", *Physical Chemistry Chemical Physics*, vol. 10 (2008), pp. 1931-1943.

Katsounaros, I., et al., "Hydrogen Peroxide Electrochemistry on Platinum: Towards Understanding the Oxygen Reduction Reaction Mechanism", *Phys. Chem. Chem. Phys.*, vol. 14 (2012), pp. 7384-7391.

An, J., et al., "Ultra-Thin Platinum Catalytic Electrodes Fabricated by Atomic Layer Deposition", *Phys. Chem. Chem. Phys.*, vol. 15 (2013), pp. 7520-7525.

"Surface Area of Platinum Catalysts: Determination of Metal Particle Size", *Platinum Metals Rev.*, vol. 4, No. 3 (1960), pp. 92-93.

DOE Hydrogen Program, FY 2010 Annual Progress Report, "V.E.5 Advanced Cathode Catalysts", pp. 816-824.

Adzic, R.R., et al., "Platinum Monolayer Fuel Cell Electrocatalysts", *Top Catal.*, vol. 46 (2007), pp. 249-262.

Abadias, G., et al., "Structural and Photoelectrochemical Properties of $Ti_{1-x}W_xO_2$ Thin Films Deposited by Manetron Sputtering", *Surface and Coatings Technology*, vol. 205 (Jul. 1, 2011), pp. S265-S270.

Akurati, K.K., et al., "Flame-made $WO_3/TiO_2$ Nanoparticles: Relation Between Surface Acidity, Structure and Photocatalytic Activity", *Applied Catalysis B: Environmental*, vol. 79 (2008), pp. 53-62.

Bing, Y., et al., "Nanostructured Pt-alloy Electrocatalysts for PEM Fuel Cell Oxygen Reduction Reaction", *Chemical Society Reviews*, vol. 39 (2010), pp. 2184-2202.

Cappellani, A., et al., "Processing and Characterisation of Sol-gel Deposited $Ta_2O_5$ and $TiO_2$—$Ta_2O_5$ Dielectric Thin Films", *Solid-State Electronics*, vol. 43, No. 6 (Jun. 1, 1999), pp. 1095-1099.

Chhina, H., et al., "Ex Situ and In Situ Stability of Platinum Supported on Niobium-Doped Titania for PEMFCs", *Journal of the Electrochemical Society*, vol. 156, No. 10, (2009), pp. B1232-B1237.

(56) References Cited

OTHER PUBLICATIONS

Chhina, H., et al., "Transmission Electron Microscope Observation of Pt Deposited on Nb-Doped Titania", *Electrochemical and Solid-State Letters*, vol. 12, No. 6 (2009), pp. B97-B100.

Do, T.B., et al., "Niobium-Doped Titanium Oxide for Fuel Cell Application", *Electrochimica Acta*, vol. 55, No. 27 (2010), pp. 8013-8017.

Harry, G.M., et al., "Titania-Doped Tantala/Silica Coatings for Gravitational-Wave Detection", *Classical Quantum Gravity*, vol. 24, No. 2 (Jan. 21, 2007), pp. 405-415.

Huang, S-Y., et al., "Electrocatalytic Activity and Stability of Niobium-Doped Titanium Oxide Supported Platinum Catalyst for Polymer Electrolyte Membrane Fuel Cells", *Applied Catalysis B., Environmental*, vol. 96, No. 1-2 (2010), pp. 224-231.

Lin, Q., et al., "Hydrogenation of Pyrene Using Pd Catalysts Supported on Tungstated Metal Oxides", *Applied Catalysis A: General*, vol. 387 (2010), pp. 166-172.

Nagaveni, K., et al., "Structure and Photocatalytic Activity of $Ti_{1-x}M_xO_{2+\delta}$(M=W, V, Ce, Zr, Fe, and Cu) Synthesized by Solution Combusion Method", *J. Phys. Chem B*, vol. 108 (Dec. 1, 2004), pp. 20204-20112.

Subban, C.V., et al., "Sol-Gel Synthesis, Electrochemical Characterization, and Stability Testing of $Ti_{0.7}W_{0.3}O_2$ Nanoparticles for Catalyst Support Applications in Proton-Exchange Membrane Fuel Cells", *J. Am. Chem. Soc.*, vol. 132, No. 49 (Dec. 15, 2010), pp. 17531-17536.

Subban, C.V., et al., "Sol-Gel Synthesis, Electrochemical Characterisation, and Stability Testing of $Ti_{0.7}W_{0.3}O_2$ Nanoparticles for catalyst support applicationsin proton-exchange membrane fuel cells", supporting information Nov. 19, 2010, retrieved from url:http://pubs.acs.org/doi/suppl/10.1021/ja1074163/suppl_file/ja1074163_si_001.pdf [retrieved on Mar. 27, 2014].

Taylor, M.N., et al., "Synergy Between Tungsten and Palladium Supported on Titania for the Catalytic Total Oxidation of Propane", *Journal of Catalysis*, vol. 285 (2012), pp. 103-114.

\* cited by examiner

MIXED METAL OXIDE MATERIAL OF TIN AND TITANIUM

This application is a National Stage application of International Application No. PCT/GB2014/050118, filed Jan. 16, 2014, which claims the benefit of United Kingdom Application No. 1300810.7, filed Jan. 16, 2013.

The present invention relates to materials for use in a fuel cell and particularly to core-shell composite materials for use in a fuel cell.

A fuel cell comprises an anode for oxidation of a fuel and a cathode where an oxidising agent, such as oxygen, is reduced. Ions are transported between the two electrodes by means of an electrolyte. Fuel supplied to the cell is oxidised at the anode, releasing electrons which pass through an external circuit to the cathode, where they are consumed during reduction of the oxidising species. In a polymer electrolyte membrane fuel cell (PEMFC), the fuel is usually hydrogen and the oxidising species is usually oxygen. A polymer electrolyte allows protons to flow from the anode to the cathode.

Platinum-containing catalysts are one of the most efficient catalysts for facilitating the oxygen reduction reaction (ORR) at the cathode of a fuel cell. Platinum, however, is a costly material and so methods for reducing the quantity of platinum required for an effective fuel cell are highly sought-after. Traditionally, platinum is dispersed over a carbon support to increase the surface area of the platinum, relative to its mass. A maximum in mass activity is produced with a platinum particle size of approximately 3-4 nm [References 1-4]. In this system, if the particle size of platinum is further reduced, oxygen reduction activity is also sharply reduced, limiting advantages that can be achieved by dispersion. An additional disadvantage with the system is that the carbon support can become oxidised under fuel cell operating conditions. This oxidation leads to degradation of the catalyst, which limits the lifetime of the fuel cell [5].

Metal oxides have previously been investigated for use as fuel cell catalyst supports [6-18]. Metal oxides are less prone to oxidative corrosion than carbon, and can, therefore, be more stable in a fuel cell environment. The use of metal oxides as supports for fuel cell catalysts and methods of synthesising suitable oxides has been described in, for example, US2009/0065738A1, US2006/0263675, U.S. Pat. No. 7,704,918B2, US2007/0037041A1, WO2008/025751 and WO2009/152003 [14-18].

Core-shell catalysts with Pt as the shell material are reported in the literature [17-28]. A core-shell structure is represented schematically in FIG. 1. Many of the systems described in the literature contain a precious metal core, such as Au or Pd [19-22, 24-26, 28]. Consequently, although there is a potential reduction in the quantity of platinum required to produce an effective catalyst, use of another expensive metal within the core, keeps costs high. Other reported core materials include base metals (Cu [27], for example), which are more cost-effective than platinum, but likely to be unstable in a fuel cell. Adzic et at [17, 18] disclose a core-shell type structure with a $NaWO_3$ core. WO2008/025751 [29] discloses a Pt-coated zirconia and cerium-doped zirconia core-shell system.

There is a report in the literature illustrating the use of tin oxide as a core support material for a platinum catalyst shell for use in a direct ethanol fuel cell [24]. This system shows good activity for ethanol oxidation. However, there is no evidence in the literature to suggest that the catalyst is stable, either with continued cycling or in an acid environment. It has previously been demonstrated that $SnO_2$ has an inherent conductivity because it readily forms oxygen vacancies [19].

The present invention seeks to provide materials for core-shell catalysts, which have a high specific activity for oxygen reduction at low loadings of platinum, i.e., a high activity per unit mass of platinum. It is a further aim to provide catalyst supports which are stable both in an electrochemical environment and under warm acidic conditions.

The present invention is based on the determination that a support material based on tin-doped titanium oxide provides for improved wetting of platinum that has been applied to the surface of the oxide. The materials of the present invention allow more complete platinum films to be achieved at lower platinum loadings, compared to support materials comprising titanium oxide (also known as titania) only.

The inventors have identified a correlation between the quantity of tin in a titanium oxide support and the loading of platinum required to achieve bulk platinum-like activity.

The inventors have also found that the crystalline structure of titanium oxide has an effect on the amount of platinum required to achieve bulk platinum-like activity for the oxygen reduction reaction.

In its broadest aspect, the present invention provides a mixed metal oxide material of tin and titanium.

Preferably, the material comprises an oxide of titanium doped with tin.

In a preferred embodiment, the metal content of the material comprises at least approximately 15 atomic % tin and not more than approximately 80 atomic % titanium. More preferably, the material comprises between 24 and 28 atomic % tin (on a metal basis) and between 72 and 76 atomic % titanium.

Advantageously, the titanium oxide is in a crystalline form.

Another aspect of the present invention provides a catalyst support comprising a mixed metal oxide material as described above.

A further aspect of the present invention provides a catalytic medium comprising a mixed metal oxide material as described above and a catalyst applied to a surface of the mixed metal oxide material.

Preferably, the catalyst is applied as a catalytic layer to the mixed metal oxide material.

In one embodiment, the mixed metal oxide material is formed as a core particle.

Preferably, the particle has a diameter of 10-50 nm, more preferably 10-25 nm.

Suitably, the catalyst is applied as a shell on the core particle.

In an alternative embodiment, the mixed metal oxide material is formed as a layer.

Preferably, the catalyst comprises or consists of platinum or platinum alloy.

Preferably, the catalyst comprises one monolayer (ML) or more of platinum or platinum alloy. Even more preferably, the catalyst comprises 1.5 ML or more of platinum or platinum alloy.

Preferably, the catalysts comprises 20 ML or fewer of platinum or platinum alloy, more preferably 15 ML or fewer, most preferably 10 ML or fewer.

Preferably, the catalyst is applied to the mixed metal oxide material in a thickness of from 1 to 5 ML; more preferably 1.5 to 5.

According to another aspect of the present invention, there is provided a method of producing a catalytic medium, the method comprising forming a mixed metal oxide material as defined above; and forming a catalytic layer comprising at least one monolayer of catalyst on the mixed metal oxide material.

More preferably, the method comprises forming a catalytic layer of from 1 to 5 ML of catalyst; more preferably 1.5 ML or more.

A further aspect of the present invention provides a catalytic medium for a fuel cell, the catalyst comprising a mixed metal oxide material as described above.

The present invention also provides a fuel cell comprising a catalytic medium as described above.

A yet further aspect of the present invention provides use of a mixed metal oxide material as described above or a catalytic medium as described above in a fuel cell.

The term monolayer (ML) as used herein is used to mean the equivalent amount of catalytic material which would form a uniform layer of 1 atom thickness on a flat surface. It will be appreciated that, in practice, a surface of the mixed metal oxide is unlikely to be perfectly atomically flat. Accordingly, it will be understood that a 1 ML layer of catalyst on the mixed metal oxide substrate will have areas where there are a plurality of catalyst atoms in a layer and areas where there are no atoms of catalyst.

As used herein, the term mixed metal oxide indicates an oxide of a mixture of metals; a mixture of metal oxides; or a combination thereof.

For ease of reference, we will refer to mixed metal oxide materials of tin and titanium by the formulation $TiSnO_x$. It will be appreciated that this is not a chemical formula indicating any specific stoichiometry, but merely a shorthand indication of the elemental composition of the material.

The inventors have identified the loading of platinum at which bulk platinum like oxygen reduction behaviour is achieved for tin-doped anatase titanium oxide. It will be appreciated that the tin atoms disrupt the original anatase crystal structure of the titanium oxide. Bulk platinum like oxygen reduction behaviour is believed to occur when discrete particles of platinum coalesce to form layers (i.e. in a core-shell structure).

Thin film models of core-shell catalysts for the oxygen reduction reaction in PEM fuel cells were synthesised with metal oxide cores and a platinum catalyst shell. Metal oxides offer a stable alternative to carbon supports (which are prone to oxidative destruction) and therefore increase the lifetime of fuel cells.

Figure 1:
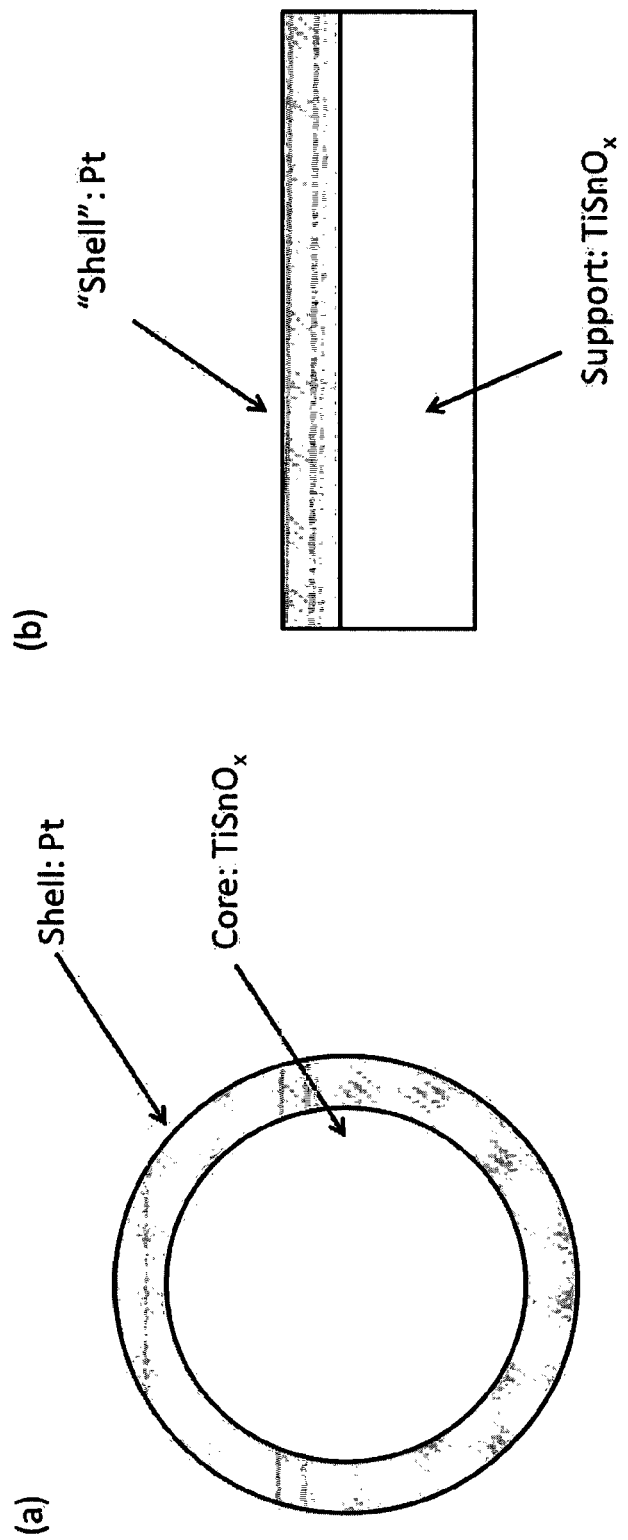
FIG. 1 is a schematic cross-section of a core-shell structure and an equivalent layer structure used to model the core shell particle behaviour.
Figure 2:
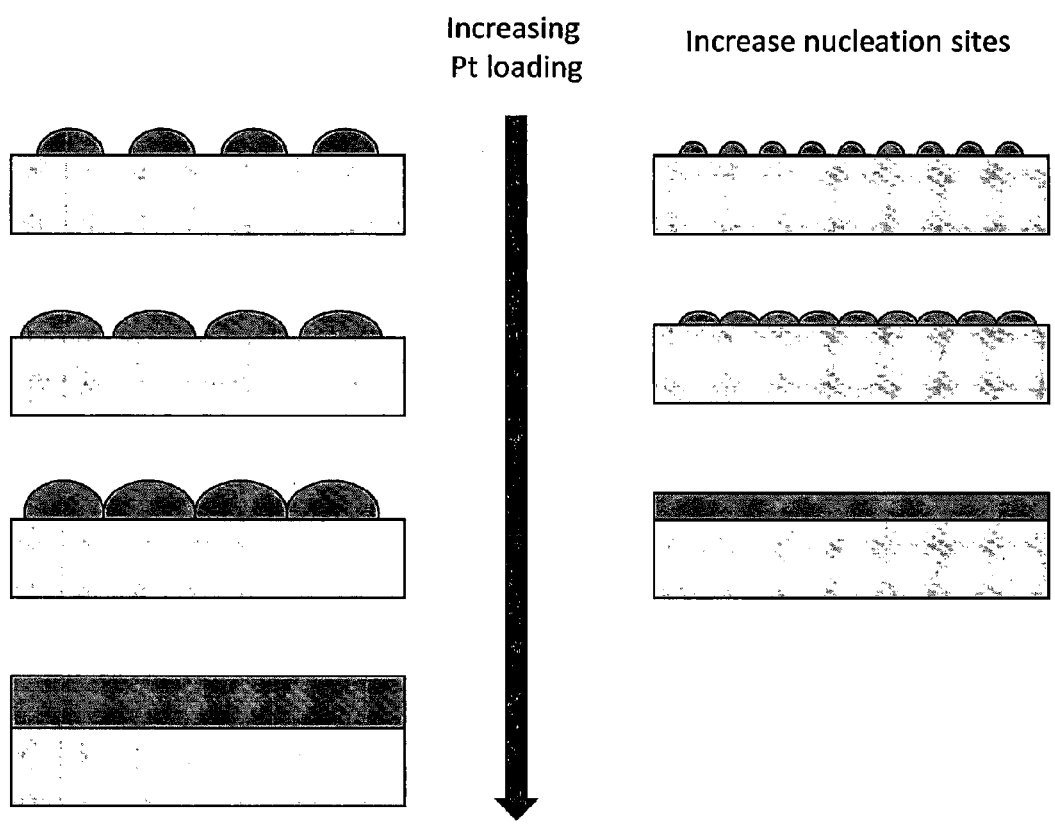
FIG. 2 is a schematic representation of particle growth and nucleation onto supports with a low number of nucleation sites and an increased number of nucleation sites.

As described below, the present inventors have produced thin film models of core-shell structures with a $TiSnO_x$ core and a platinum shell, which have the same (or similar) activity for oxygen reduction as bulk platinum. In addition to increased conductivity, it appears that the tin can help to create defects on the surface of the mixed metal oxide and cause more sites for nucleation of a metal overlayer. Addition of tin therefore causes smaller particles of platinum to be formed and leads to a more complete film at a lower equivalent thickness (or loading) of metal (as illustrated in FIG. 2). A film of platinum, compared to discrete particles, can approach the oxygen reduction activity of bulk platinum since a significant number of platinum atoms will be in contact.

The experiments below also show that when a titanium oxide support is crystallised (to form specifically the anatase form), an overpotential for the oxygen reduction reaction equivalent to that of bulk platinum is achieved at a lower equivalent thickness of platinum than on the amorphous support.

The amount of tin added to the titanium oxide which has been treated under the conditions necessary to form the anatase form prior to introduction of tin doping atoms, was shown to have a significant effect on the minimum thickness required to achieve the same overpotential for the oxygen reduction reaction as bulk platinum (defined as $d_{crit}$). At low tin doping, $d_{crit}$ increases, i.e. higher loadings of Pt are required than on un-doped titanium oxide to achieve bulk Pt like behaviour. However, at a higher tin content, above approximately 24 atomic % (at. % on a metal basis), $d_{crit}$ was lowered to approximately 3.2 ML equivalent thickness of platinum. At 1.6 ML equivalent thickness, the overpotential was only slightly higher than that for bulk platinum. This performance at high tin loadings was retained after stability cycling and the tin doped titanium oxide was shown to be stable in a warm acidic environment to approximately 28 at. % (based on the total metal content, ie., excluding oxygen content).

EXAMPLE 1

Synthesis of Samples

Figure 3:
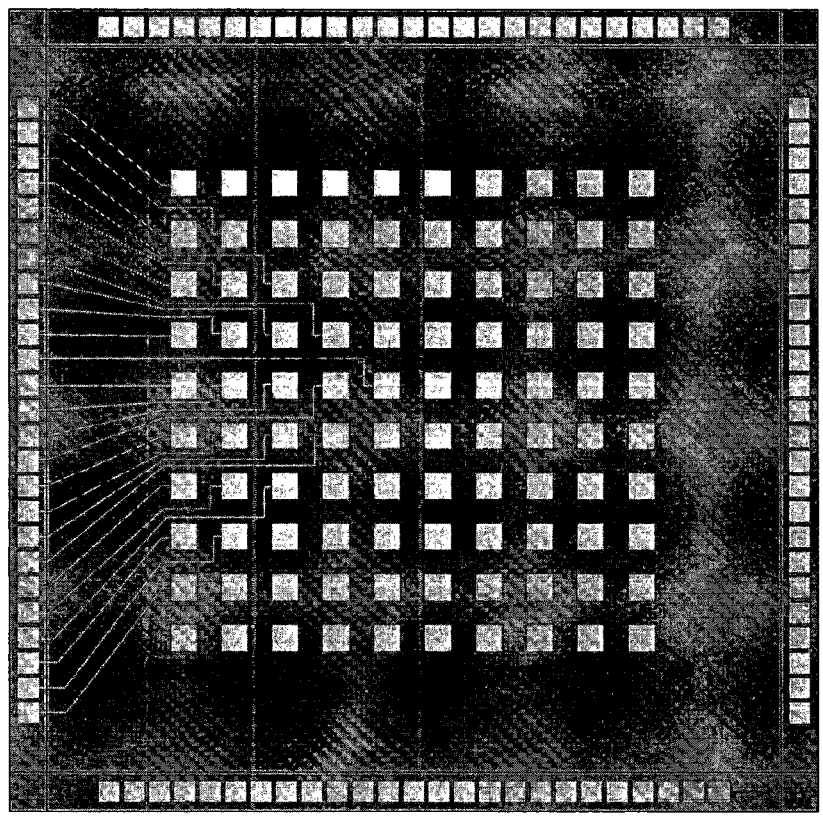
FIG. 3 is a schematic view of an electrochemical array substrate.

Thin film samples were deposited using a high-throughput PVD (Physical Vapour Deposition) system to model core-shell structures. Thin film models of the core-shell system are schematically represented in FIG. 2. The PVD system is described in detail elsewhere [31]. A range of oxide samples were synthesised onto different substrates including silicon wafers, quartz wafers and electrochemical arrays (10×10 arrays of gold contact pads, as represented in FIG. 3). Titanium was deposited from an electron gun (E-gun) source and tin was deposited from a Knudsen cell (K-cell) source. $TiSnO_x$ samples were prepared in the presence of molecular oxygen at a pressure of approximately $5\times10^{-6}$ Torr. Thin-film oxides were heated in a tube furnace at 450° C. under a flow of oxygen for 6 hours. These conditions allowed the anatase structure of the un-doped titanium oxide to form.

Platinum was deposited onto the pre-deposited oxide thin films from an E-gun source. During deposition, the oxide substrates were heated to 200° C. in order to dehydroxylate the surface. A shutter was moved during deposition to allow different equivalent thicknesses of platinum to be deposited onto different fields. The deposition procedures allowed for a varying oxide composition of the support in one direction and a varying amount of platinum in the other orthogonal direction. The amount of platinum deposited was calibrated by depositing thicker films onto silicon substrates and measuring the thickness of the films by AFM (Atomic Force Microscopy). A calibration curve against deposition time was then produced.

EXAMPLE 2

Oxide Characterisation

The composition of the oxide films was determined using a Laser Ablation Inductively Coupled Plasma Mass Spectrometer (LA-ICP-MS, New Wave 213 nm laser & Perkin Elmer Elan 9000). This method provides the relative composition of the metallic elements, but is not capable of measuring the oxygen concentration. Since the ICP-MS measurements are destructive, composition measurements were made on samples deposited onto silicon wafers. The same deposition conditions were used to deposit onto equivalent electrochemical arrays.

X-Ray diffraction (XRD) patterns were obtained using the Bruker D8 Discover diffractometer, having a high-precision, two-circle goniometer with independent stepper motors and optical encoders for the Theta and 2 Theta circles. The D8 diffractometer system was equipped with a GADDS detector operating at 45 kV and 0.65 mA. A high intensity X-ray IμS Incoatec source (with Cu Kα radiation) was incorporated allowing high intensity and collimated X-rays to be localised on thin film materials, providing an efficient high throughput structural analysis. This analysis was carried out on oxide films deposited onto Si substrates.

Stability tests were carried out on the oxide films deposited on Si substrates. The samples were immersed in 200 mL of 0.1 M $H_2SO_4$ at 80° C. for a period of 24 hours.

Photographs of the samples were obtained after 0, 2, 4, 6 and 24 hours. ICP-MS was also carried out on the samples before and after this testing.

EXAMPLE 3

TEM of Pt Film

Transmission Electron Microscopy measurements were performed using a JEOL JEM-3010 TEM with an accelerating voltage of 300 kV. All images were at a magnification of ×200,000. The scale bars illustrated in the figures represent a length of 20 nm. The samples were prepared for analysis by depositing various thicknesses of Pt onto fresh carbon coated TEM grids (for comparison with the oxide materials), and oxide covered TEM windows which had previously been treated at 450° C. in oxygen for 6 hours.

EXAMPLE 4

Electrochemical Screening

High-throughput electrochemical screening equipment enables electrochemical experiments on 100 independently addressable electrodes arranged in a 10×10 array in a parallel screening mode. This system has been described in detail elsewhere [2, 32]. The geometric areas of the individual working electrodes on the electrochemical array are 1.0 mm².

The design of the cell and socket assembly provides a clean electrochemical environment with control of the temperature during experiments. In the experiments described, the temperature was maintained at 25° C. and a mercury/mercury sulphate (MMSE) reference electrode was used. The potential of the MMSE was measured vs. a hydrogen reference electrode prior to screening experiments and all potentials are quoted vs. the reversible hydrogen electrode (RHE). A Pt mesh counter electrode was used, in a glass compartment separated from the working electrode compartment by a glass frit. Various sweep rates were used for different experiments which are outlined in Table 1.

The electrolyte used for all experiments was 0.5 M $HClO_4$ prepared from concentrated $HClO_4$ (double distilled, GFS) and ultrapure water (ELGA, 18 MΩ cm). The gases used (Ar, $O_2$ and CO) were of the highest commercially available purity (Air Products). Unless stated otherwise, experiments were performed under an atmosphere of argon. Oxygen reduction experiments were performed under an atmosphere of $O_2$. During potential step measurements, oxygen was bubbled through the electrolyte. Unless noted otherwise, the maximum potential applied to the electrodes was 1.2 V vs. RHE. The screening procedure carried out on each array is outlined in Table 1.

TABLE 1

| Experiment | Gas | Potential limits/ V vs. RHE | Sweep rate/ mV s$^{-1}$ |
|---|---|---|---|
| | Electrochemical screening procedure. | | |
| 3 CVs in deoxygenated solution | Bubbling Ar 20 min<br>Ar above solution | 0.025-1.200 | 100 |
| $O_2$ saturation | Bubbling Ar 60 s<br>Bubbling $O_2$ 10 min | At 1.000<br>At 1.000 | |
| $O_2$ reduction steps | Bubbling $O_2$ in solution | Step from 1.00 to 0.60 and back to 1.00 in 50 mV increments every 90 s | |
| 3 CVs in $O_2$ saturated solution | $O_2$ above solution | 0.025-1.200 | 5 |
| 200 CVs stability testing | Bubbling Ar 20 min<br>Ar above solution | 0.025-1.200 | 100 |
| 3 CVs in $O_2$ saturated solution | Bubbling with $O_2$ for 20 min<br>$O_2$ above solution | At 1.000<br>0.025-1.200 | 5 |
| $O_2$ reduction steps | Bubbling $O_2$ in solution | Step from 1.00 to 0.60 and back to 1.00 in 50 mV increments every 90 s | |
| CO stripping | Bubbling CO 15 min<br>Bubbling Ar 20 min<br>Ar above solution | At 0.075<br>At 0.075<br>0.025-1.200 | 100 |

EXAMPLE 5

Anatase and Amorphous Titanium Oxide

To compare amorphous and crystalline titanium oxide as a support for Pt, separate electrochemical arrays were synthesised. The deposited titanium oxide was amorphous. The titanium oxide was then crystallised by heating in a tube furnace at 450° C. for 6 hours under a flow of oxygen. XRD confirmed the titanium oxide had been crystallised in the anatase form.

Figure 4:
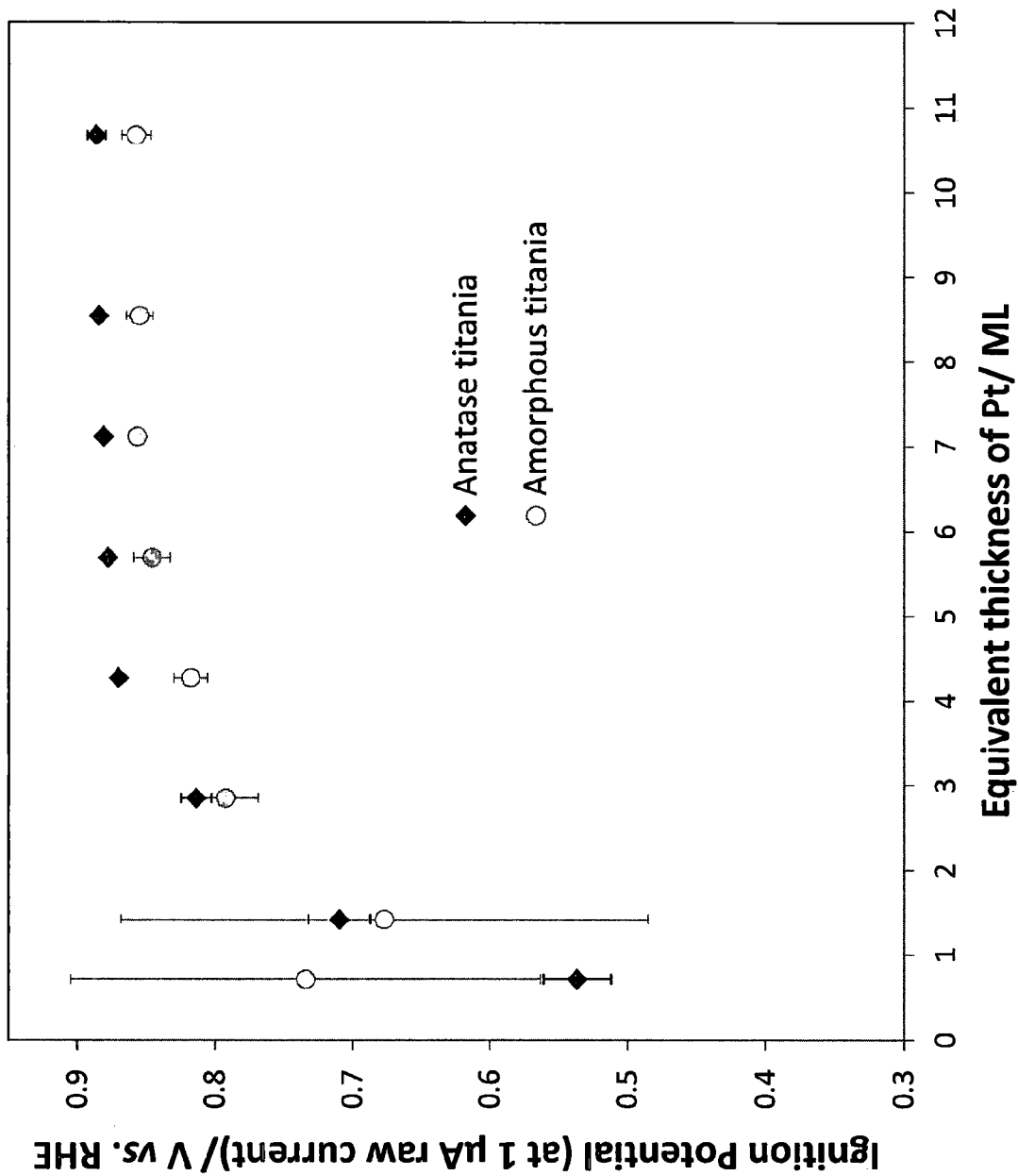
FIG. 4 is a chart illustrating the potential at which 1 µA raw current is reached during the oxygen reduction slow cycling experiment for Pt supported on amorphous and anatase titanium oxide. Error bars are plus and minus one standard deviation.

FIG. 4 shows the potential at which 1 µA raw current is reached (the threshold value used to measure the ignition or onset potential) during the oxygen reduction slow cycling experiment. An ignition or onset potential is defined as the potential at which the absolute value of the current starts to increase from the background (double layer) level in a cyclic voltammetry experiment, indicating that an oxidation or reduction reaction is taking place at that potential. Cycling was at 20 mV s$^{-1}$ in oxygenated 0.5 M $HClO_4$ for various equivalent thicknesses of Pt. Average results were taken across an array row for identical Pt equivalent thicknesses for Pt supported on amorphous and anatase titanium oxide. The ignition potential gives a measure of the onset potential of the oxygen reduction reaction (the higher the onset potential the more active the catalyst for the oxygen reduction reaction).

Figure 5:
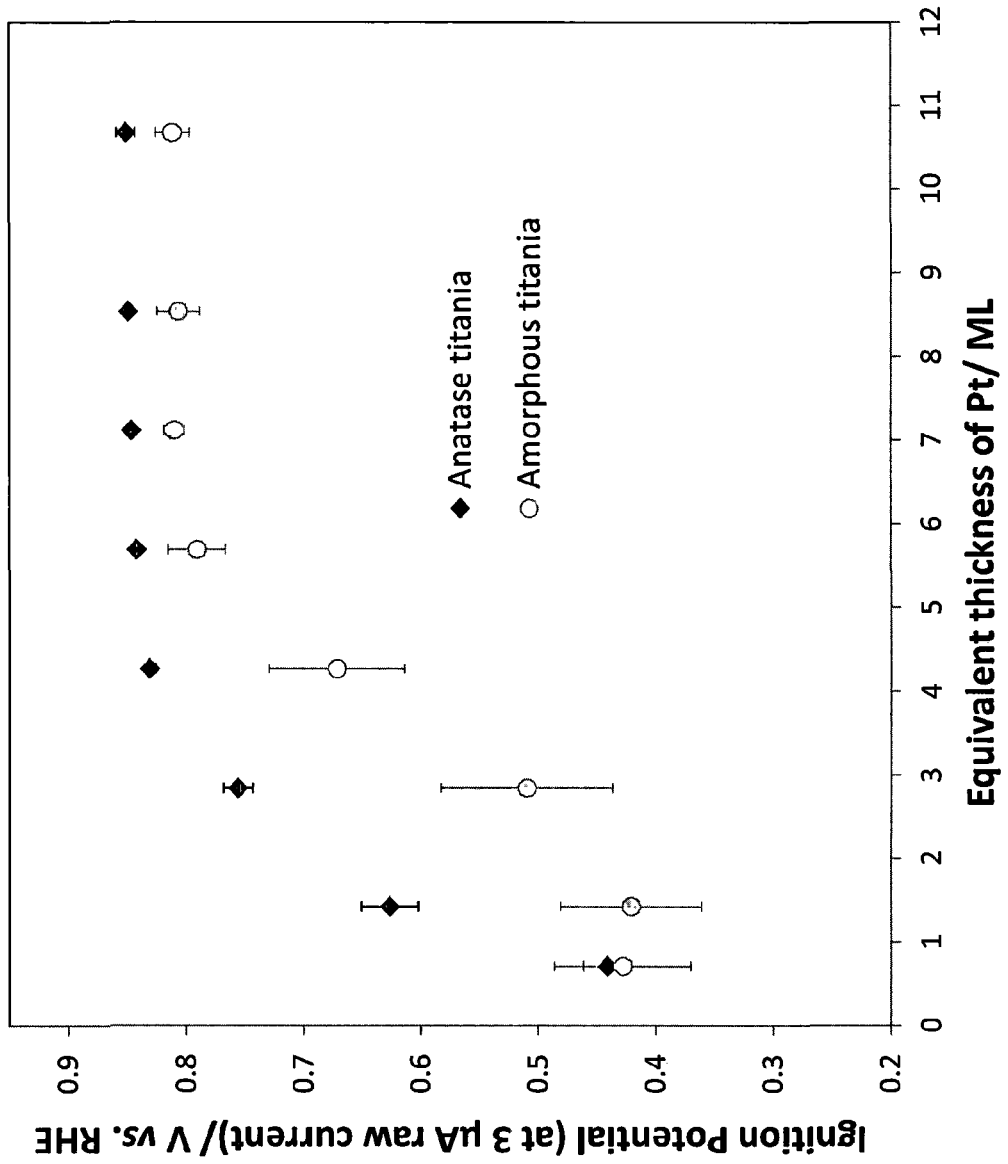
FIG. 5 is a chart illustrating the potential at which 3 µA raw current is reached during the oxygen reduction slow cycling experiment for amorphous and anatase titanium oxide. Error bars are plus and minus one standard deviation.

At high equivalent thicknesses of Pt, the ignition potential remained fairly constant with decreasing equivalent thickness of Pt. The ignition potential was similar for both support materials. However, between 5 and 6 ML (monolayers) equivalent thickness of Pt, the ignition potential starts to decrease on both support materials. The effect on the amorphous material is more significant. Below 5 ML, for both supports, the ignition potential decreases further. On the amorphous titanium oxide at low equivalent thicknesses there is a large amount of scatter in the data. FIG. 5 shows the potential at which 3 µA raw current is reached in the oxygen reduction slow cycling experiment for the same set of data. At 3 µA, it is clear that the reduction wave shifted more significantly negative on the amorphous support, suggesting that the anatase support provides better wetting for the platinum and therefore higher activity down to a lower equivalent thickness (and therefore loading) of Pt.

Figure 6:
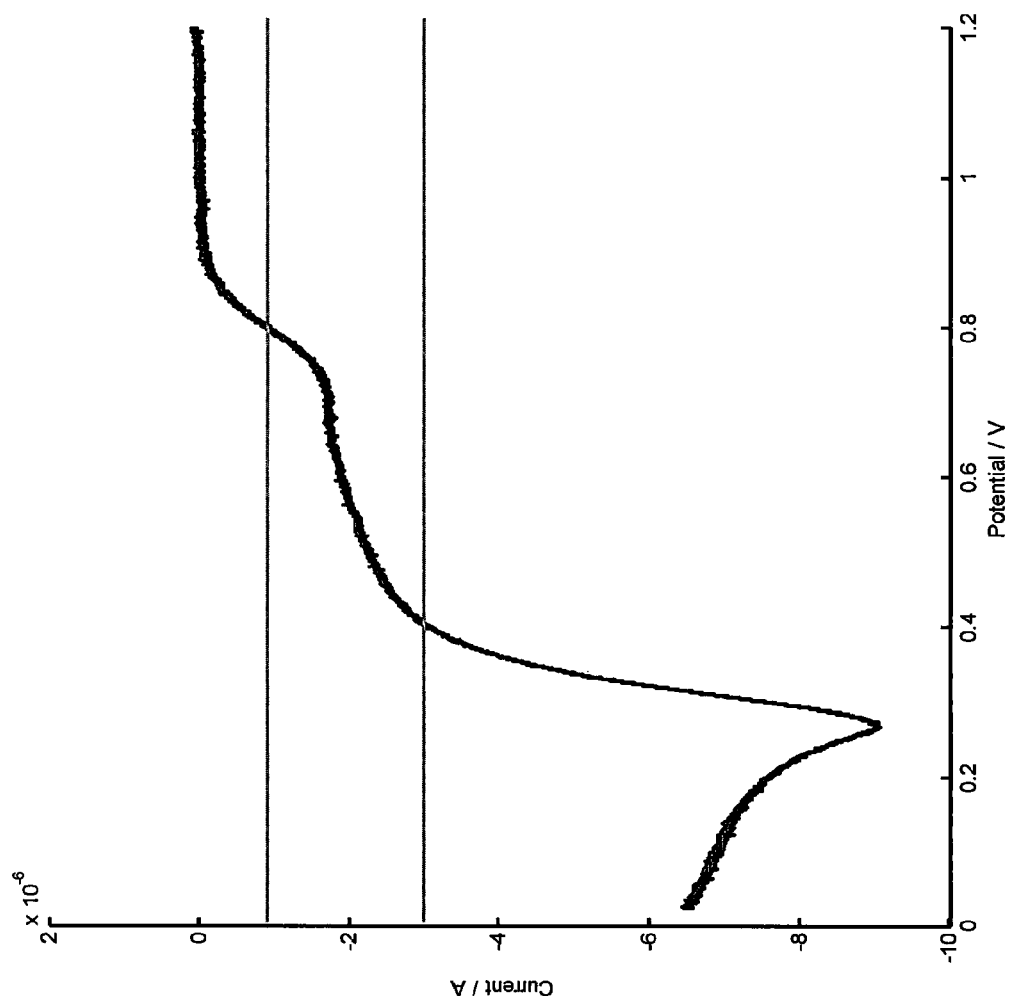
FIG. 6 is a chart illustrating example $O_2$ reduction slow cycling CV for 0.7 ML of Pt supported on amorphous $TiO_x$ indicating the two different potentials where ignition potentials have been compared.

FIG. 6 shows the voltammetry for one electrode during the oxygen reduction reaction with 0.7 ML equivalent thickness of Pt supported on amorphous titanium oxide. The two currents at which ignition potentials have been measured are indicated by grey lines. Two reduction features are seen, a small feature with a high onset potential and a larger feature with a low onset potential. These two features are probably due to inhomogeneity within the sample, i.e. some large islands of platinum leading to a high ignition potential and some smaller discrete particles leading to the lower ignition potential. The ignition potential measured at 1 µA raw current gives an indication of the onset of the first reduction feature and the ignition potential measured at 3 µA raw current gives an indication of the onset of the second reduction feature.

These results suggest that the platinum shows slightly better wetting on the anatase titanium oxide allowing bulk platinum like oxygen reduction activity to a lower equivalent thickness than on amorphous titanium oxide.

EXAMPLE 6

Addition of Tin

Figure 7:
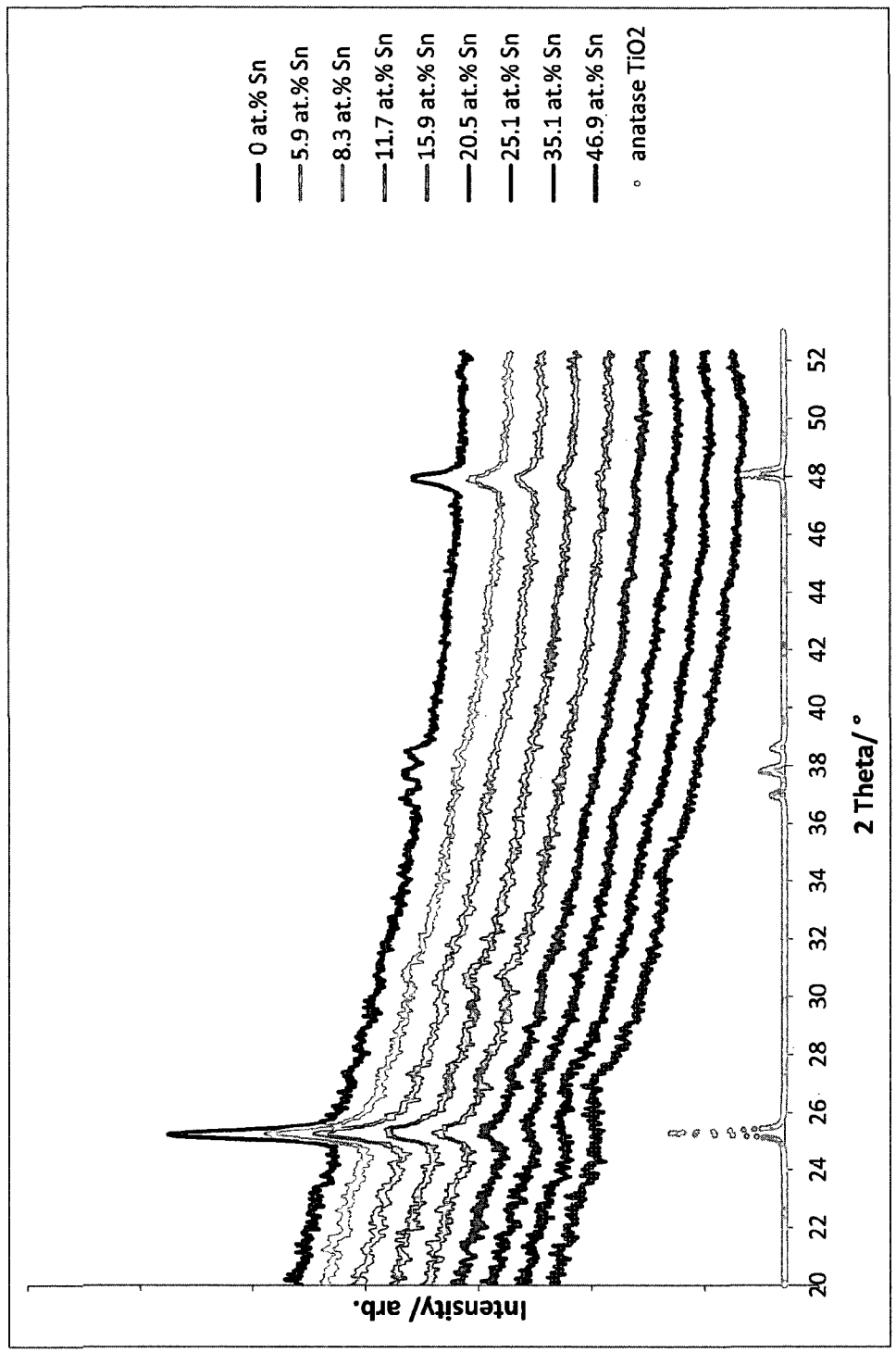
FIG. 7 is a chart illustrating XRD of $TiSnO_x$ films deposited on silicon wafers deposited at room temperature and heated for 6 hours at 450° C. with varying Sn content (also included for reference a standard anatase $TiO_2$ XRD pattern)

The $TiSnO_x$ films were deposited at room temperature and then heated to 450° C. for 6 hours under a flow of oxygen in a tube furnace. These conditions were found to form the anatase phase of $TiO_2$. FIG. 7 shows the XRD patterns obtained from films of $TiSnO_x$ with varying Sn content deposited onto a silicon substrate after heating in the furnace. As the amount of Sn in the film increases, the peaks associated with the anatase $TiO_2$ structure appear to decrease in intensity, suggesting that the Sn disrupts the anatase structure. No obvious broadening of the main peak for anatase is seen, suggesting that the crystallite size is not significantly disrupted. On the points with the highest Sn content (e.g. at 46.9 at. % Sn) some broad peaks at approximately $2\theta=26.6°$ and $2\theta=33.9°$ are seen. These probably relate to the (110) and (101) planes of cassiterite $SnO_2$ respectively (which is a rutile structure) [33]. As indicated above, atomic percentage values given are on the total metal content. That is to say, 46.9 at % Sn indicates 53.1 at % Ti. The exact stoichiometry including oxygen atoms is undefined but is at or close to stoichiometric, thereby maintains oxide properties.

Figure 8:
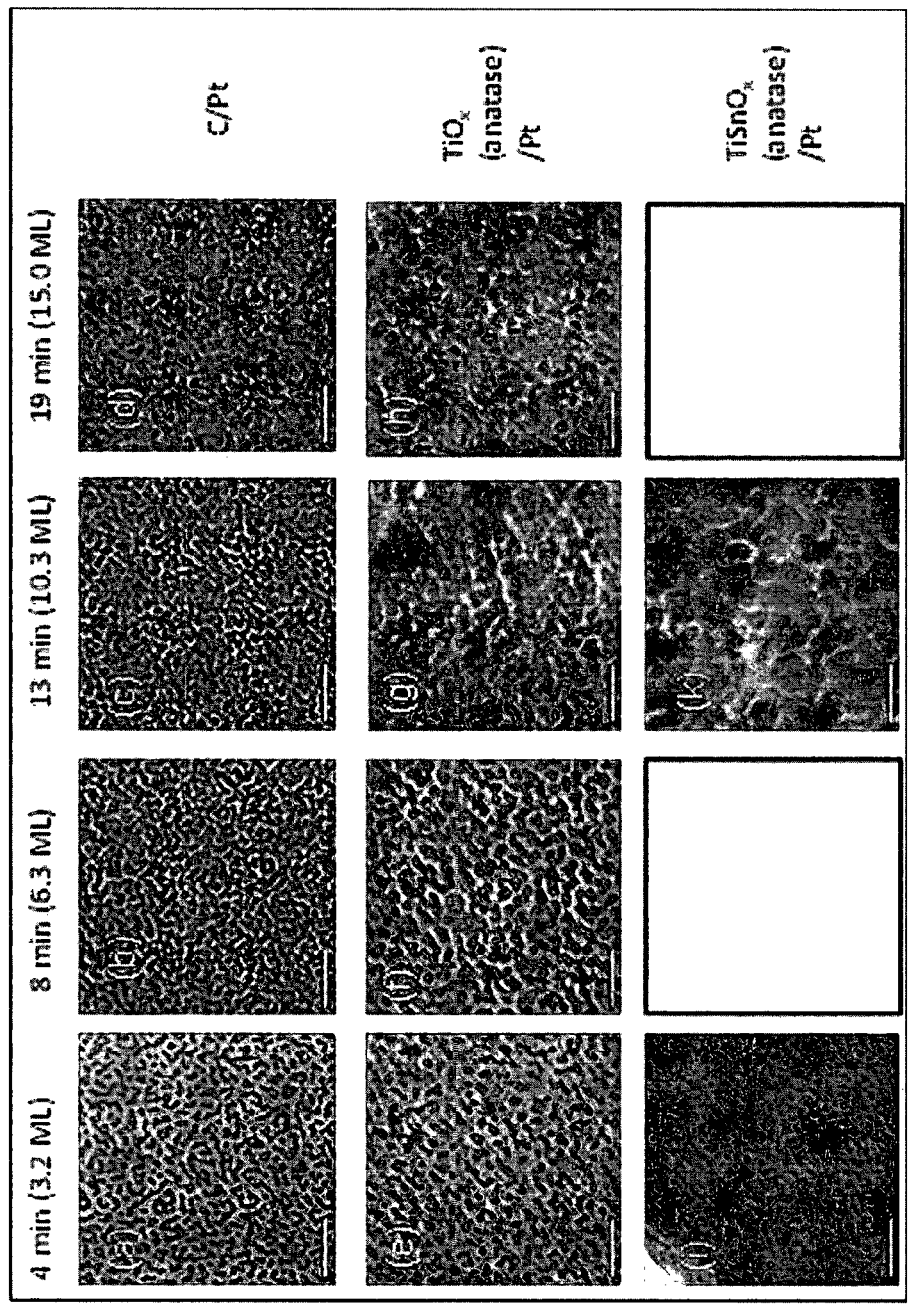
FIG. 8 shows TEM images for various equivalent thicknesses of Pt on carbon, anatase titanium oxide and tin doped anatase titanium oxide.

FIG. 8 shows TEM images for several equivalent thicknesses of Pt on carbon, anatase titanium oxide and tin-doped anatase titanium oxide (approximately 28.1 at. % Sn). Comparing the behaviour on anatase $TiO_x$ with that on carbon, it would appear that the islands formed on the oxide surface are larger than those on carbon. This might suggest that Pt wets the $TiO_x$ anatase surface better than it wets the carbon surface, since the islands are probably agglomerated small particles. On the annealed $TiSnO_x$ surface, it was difficult to image the ultra-thin films since oxide appears to roughen on annealing and the contrast of the deposited films versus the rough surface is very difficult to distinguish. This suggests that the films wet the surface very well on these tin-doped materials.

Figure 9:
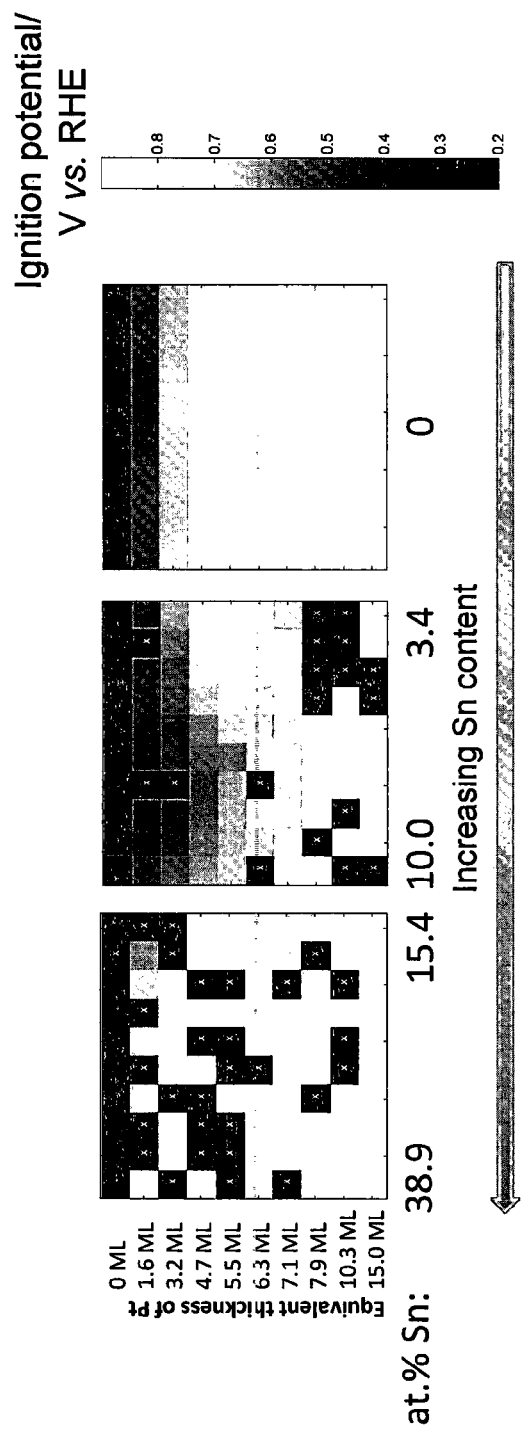
FIG. 9 is a chart illustrating ignition potential (the potential at which 1 µA raw current is reached) for the oxygen reduction reaction (the second negative going cycle at 20 mVs$^{-1}$ in $O_2$ saturated 0.5 M $HClO_4$) for Pt supported on tin-doped titanium oxide (atomic percentages of tin are shown along the bottom of the diagram) before stability cycling.

FIG. 9 shows the ignition potentials (potential at which 1 μA raw current is reached in the second negative going cycle of the oxygen reduction slow cycling experiment) for several of the arrays. Electrodes with high ignition potentials show the best activity for the oxygen reduction reaction (ORR). The critical thickness ($d_{crit}$) is the equivalent thickness of Pt below which the ignition potential starts to shift to lower potential (i.e. away from bulk Pt like behaviour). On electrodes with no Sn doping $d_{crit}$ is ~4.7-5.5 ML (monolayers or atomic layers). As a small amount of tin is added to the support, the $d_{crit}$ value initially increases with increasing tin, suggesting a decrease in activity for oxygen reduction. However, as further tin is added to the support material, $d_{crit}$ decreases again. Bulk Pt like behaviour is seen down to low equivalent thicknesses of Pt, between 3.2 and 4.7 ML at Sn contents above approximately 24 at. % Sn. At 1.6 ML equivalent thickness (above approximately 24 at. % Sn) the ignition potential is only slightly shifted, indicating only a small loss in activity.

Figure 10:
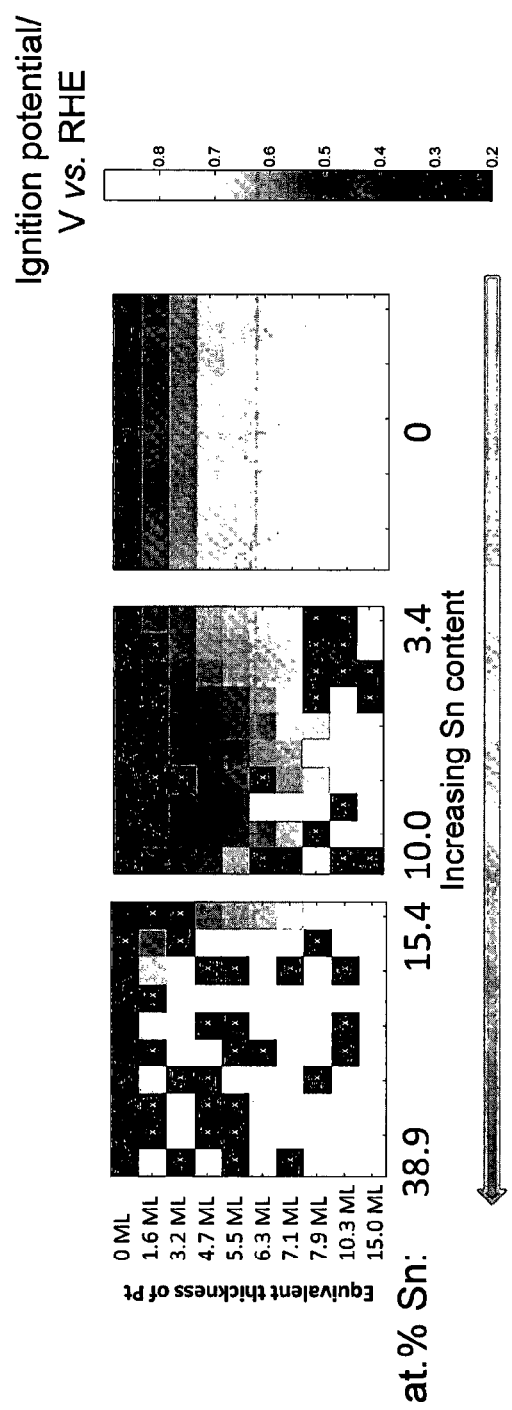
FIG. 10 is a chart illustrating ignition potential (the potential at which 1 µA raw current is reached) for the oxygen reduction reaction (the second negative going cycle at 20 mVs$^{-1}$ in $O_2$ saturated 0.5 M $HClO_4$) for Pt supported on tin doped titanium oxide (atomic percentages of tin are shown along the bottom of the diagram) after stability cycling.

200 cycles between 0.025 and 1.2 V vs. RHE were carried out on each array in Ar purged 0.5 M $HClO_4$. After this stability cycling, further oxygen reduction experiments were performed. FIG. 10 shows the equivalent ignition potential plots to FIG. 9 after stability cycling. On electrodes with no or low tin content the ignition potential has decreased for electrodes with lower equivalent thicknesses of Pt. However, on electrodes with high tin content (above approximately 24 at. % Sn), the ignition potentials remained fairly constant before and after stability cycling.

Figure 11:
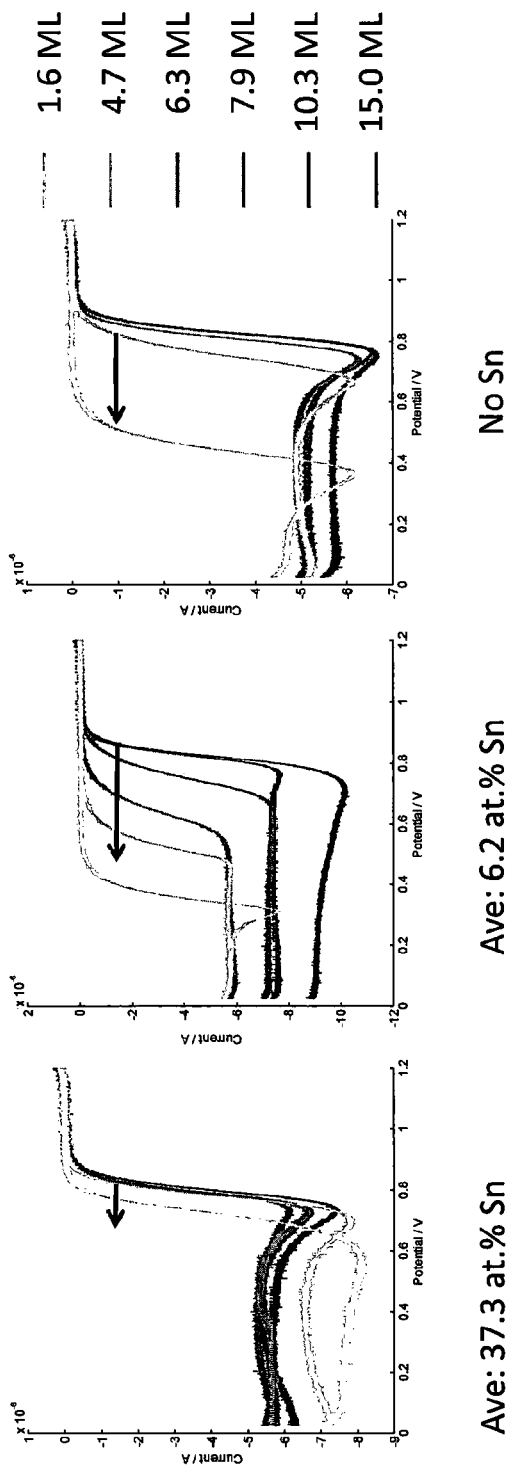
FIG. 11 is a chart illustrating the second negative going cycle of the oxygen reduction slow cycling experiment (in $O_2$ saturated 0.5 M $HClO_4$ at 20 mVs$^{-1}$) for selected $TiSnO_x$ compositions with varying Pt equivalent thickness before stability cycling.

FIG. 11 shows a comparison of oxygen reduction slow cycling voltammetry (the second negative going cycle) for several different equivalent thicknesses of Pt on electrodes with high (37.3 at. % Sn), low (6.2 at. % Sn) and no tin in the supporting titanium oxide before stability cycling. On the electrodes with no tin in the support, as the equivalent thickness of Pt decreases, the oxygen reduction voltammetry appeared to remain the same until an equivalent thickness of 4.7 ML, where the oxygen reduction wave shifted to a slightly lower potential (suggesting an increase in the overpotential for the reaction i.e. a lower ignition potential). The reduction wave shifted to lower potentials with a further decrease in equivalent thickness of Pt. On the electrodes with 6.2 at. % Sn in the support, the overpotential increased for the oxygen reduction reaction between 7.9 and 10.3 ML equivalent thickness of Pt. However, on electrodes with high tin content (37.3 at. % Sn) the overpotential increased when the equivalent thickness was decreased to 1.6 ML, suggesting the $d_{crit}$ value is between 1.6 and 4.7 ML. However the shift in onset potential at 1.6 ML was only small.

Figure 12:
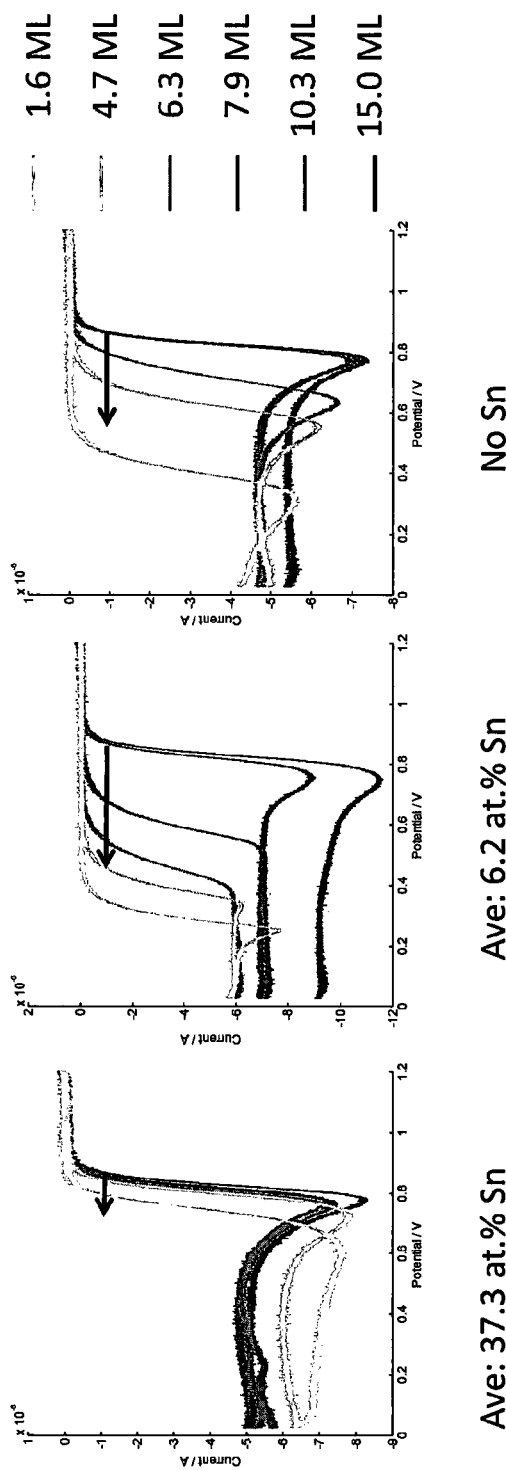
FIG. 12 is a chart illustrating the second negative going cycle of the oxygen reduction slow cycling experiment (in $O_2$ saturated 0.5 M $HClO_4$ at 20 mVs$^{-1}$) for selected $TiSnO_x$ compositions with varying Pt equivalent thickness after stability cycling.

FIG. 12 shows the oxygen reduction voltammetry (the second negative going cycle of the oxygen reduction slow cycling experiment) after stability cycling for different equivalent thicknesses of Pt supported on titanium oxide with high (37.3 at. % Sn), low (6.2 at. % Sn) and no tin content. For the electrodes with a high tin content in the support material, very little change was seen in the voltammetry before and after stability cycling. However, for electrodes with a low tin content in the support material, electrodes with higher overpotentials than bulk platinum for the oxygen reduction reaction before stability cycling shifted to an even higher overpotential (i.e. the reduction wave shifted to lower potential). For electrodes with un-doped titanium oxide as the support material, the $d_{crit}$ value shifted to between 6.3 and 7.9 ML. The negative shift of the oxygen reduction feature with decreasing equivalent thickness of Pt has been observed before on platinum supported on oxide supports. It is thought to be associated with increased irreversibility of platinum oxide formation and when Pt starts to break up into small islands and particles [7, 34]. Increased overpotentials for the ORR after stability cycling are probably associated with restructuring of the Pt films on the surface of the oxide.

Figure 13:
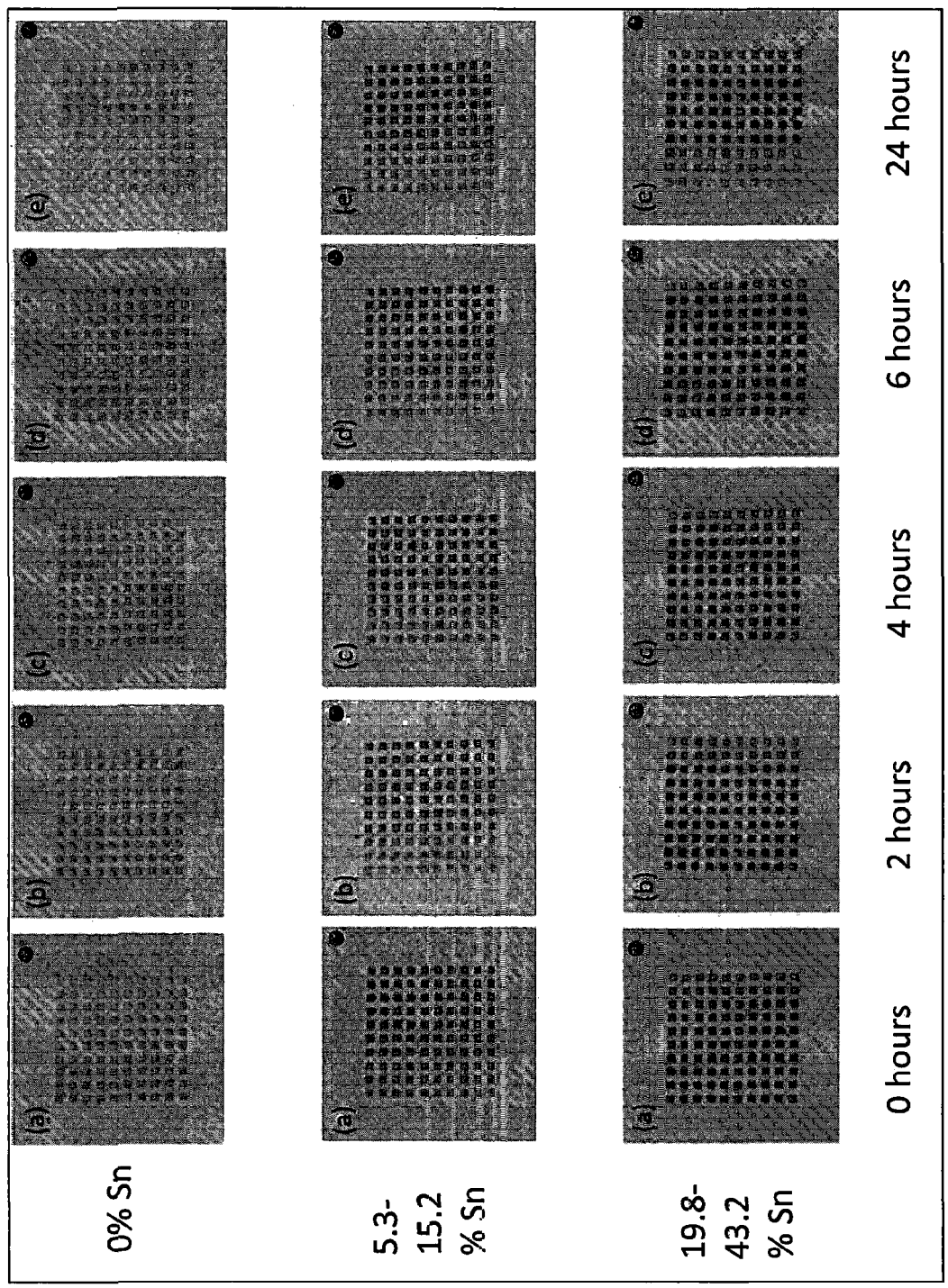
FIG. 13 shows images of $TiSnO_x$ samples (deposited on silicon wafers) with varying Sn content after exposure to 0.1 M $H_2SO_4$ for 0, 2, 4, 6 and 24 hours at 80° C.

Acid stability tests were carried out on the crystalline $TiSnO_x$ materials for the composition range of interest (~0-40 at. % Sn). The samples were immersed in 200 mL of 0.1 M $H_2SO_4$ at 80° C. for a period of 24 hours. Photographs of the samples were obtained after 0, 2, 4, 6 and 24 hours. Images of the screened samples are shown in FIG. 13. It can be seen that the first two samples were stable throughout the entire course of the experiment. However, for the sample which has the highest level of Sn content, the first 3-4 fields (highest tin) showed some sign of change of the material. This corresponds to a tin content (on a metals basis) greater than ~32 at. %.

In addition to determining whether there was any visible change in the samples on exposure to acid, ICP-MS measurements were performed before and after the acid exposure to see if any compositional change could be observed due to preferential dissolution of one element versus another.

Figure 14:
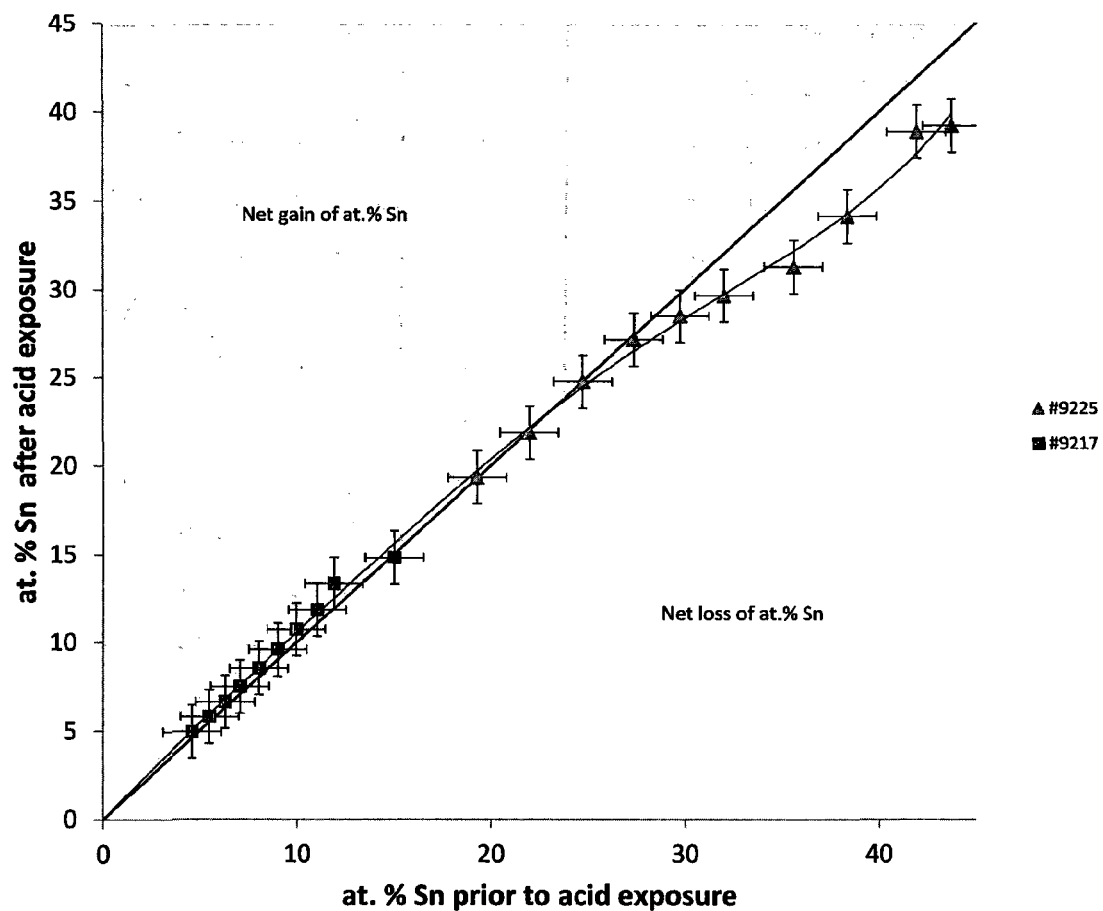
FIG. 14 is a chart illustrating a comparison of the tin content (measured by ICP-MS) of tin doped titanium oxide samples deposited on silicon wafers before and after 24 hours exposure to 0.1 M $H_2SO_4$ at 80° C.

The Sn composition varied across each array. Therefore, a row of fields were investigated for each array. FIG. 14 shows a plot of the Sn content after 24 hour exposure to an acid bath versus the initial at. % Sn. It is clear that within the error of the ICP-MS measurement there was no relative loss of Sn versus Ti for values up to 28 at. % Sn. Above this value there was evidence of a slight relative loss of Sn, eventually leading to visual loss of material observed above 32 at. % Sn.

By combining the data from the electrochemical measurements of oxygen reduction activity and the acid testing it suggests that an optimum composition of approximately 24-28 at. % Sn in the titanium oxide support provides an highly active and stable catalyst.

EXAMPLE 7

Preparation of Titania Doped Tin Particles

Particles of titania doped with tin were synthesised using the method described by Darr et al. (US 2013136687 A1), using the apparatus described therein and precursors of Titanium oxysulphate [29.9% Ti as $TiO_2$, <17 wt % free $H_2SO_4$], Tin(II) sulphate [97%] and Potassium hydroxide [>86%].

The materials formed were measured by Energy Dispersive X-Ray spectroscopy (EDX) (using a Tescan Vega 3 LMU Scanning Electron Microscope (SEM) fitted with an Energy Dispersive X-Ray (EDX) detector (Oxford Instruments X-Max 50, 50 $mm^2$ large area SDD detector)). As shown in table 2 below in which compositions are quoted as atomic percentages of tin on a metals basis (i.e. excluding oxygen), this confirmed that the level of tin doping was close to the target levels.

TABLE 2

Nominal compositions of tin doped titania particles compared with compositions measured by EDX.

| Nominal Composition (Sn at. %) | Actual Composition (Sn at. %) |
|---|---|
| 0 | 0.0 |
| 18 | 20.2 |
| 22 | 22.8 |
| 26 | 27.2 |
| 30 | 33.5 |
| 34 | 37.6 |

Figure 15:
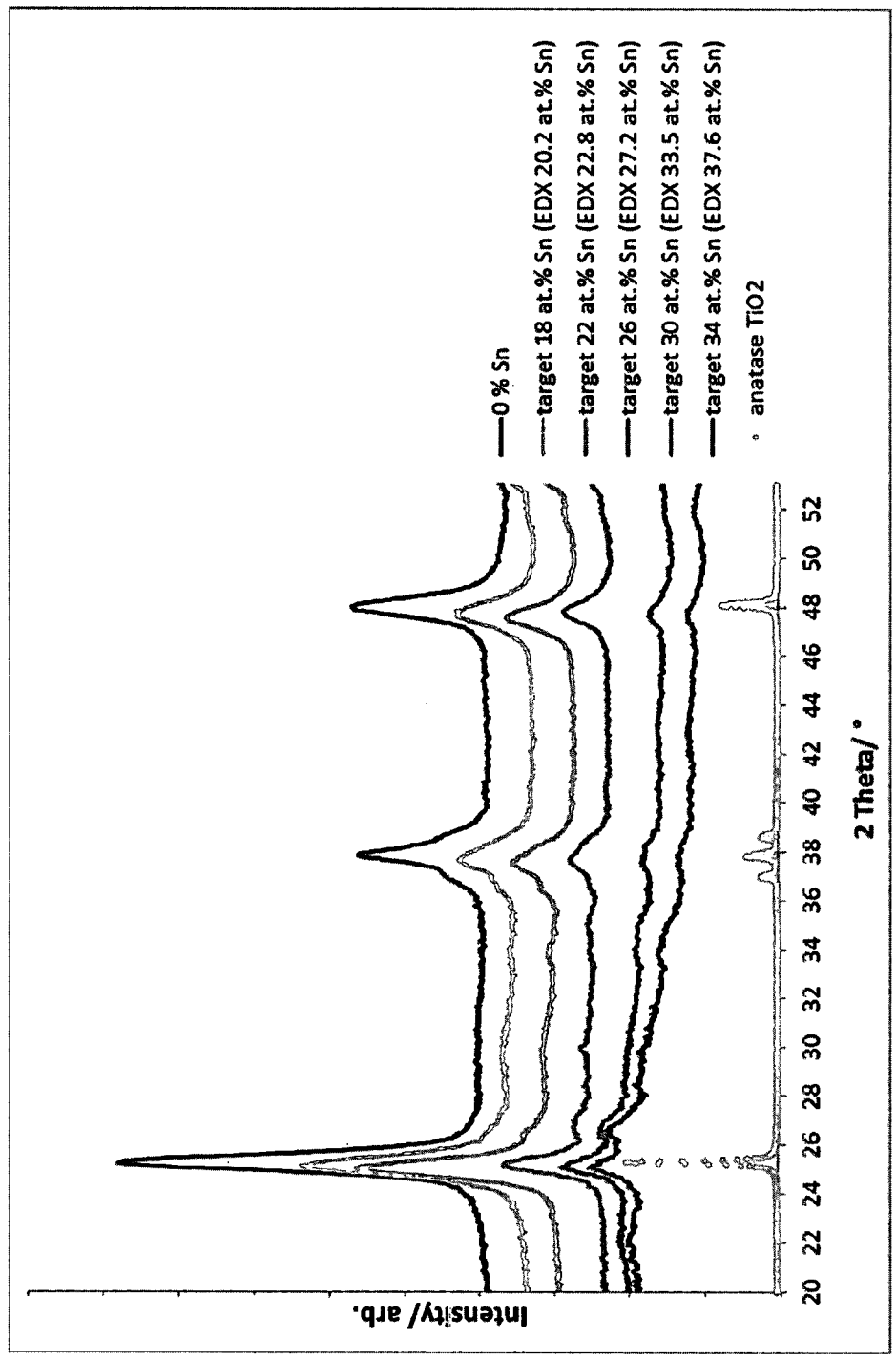
FIG. 15 is a chart illustrating XRD measurements of tin doped titania particles with varying tin content compared to a standard anatase titania reference.

XRD was carried out using the same machine as for example 2 above and measurements of the samples are shown in FIG. 15 along with a standard anatase titania reference. With no tin doping (0% Sn), peaks matching the anatase structure of titania are clearly seen, demonstrating that the method used is suitable for producing anatase titania particles. It can be seen that as the level of tin doping increases the peaks associated with anatase titania decrease in intensity, suggesting that the tin disrupts the anatase structure. Small, broad peaks at approximately $2\theta=26.6°$ and $2\theta=33.9°$ are also seen to develop as the level of tin doping increases associated with the cassiterite $SnO_2$ structure. These trends with increasing tin content are very similar to those seen with the thin film model discussed above.

These results demonstrate that it is possible to form core particles of tin doped titania, with good control of composition under conditions that would form pure anatase titania. Similar trends in crystallinity are seen to the thin film model, therefore it can be assumed that the core particles would have similar characteristics to those demonstrated by the thin film models.

Use as a Core-Shell Catalyst

The materials described in the present application are readily scaled up from the model thin film samples to bulk core shell powder materials using known techniques, such as those described in US2010/0197490, US2007/0031722, US2009/0117257, US2006/0263675 and CN 101455970. In particular, core particles produced according to example 7 could easily be coated with Pt using methods similar to those described in lines 5-10 of page 9 of WO2013/013704, to form a core-shell structure suitable for use as an electrocatalyst within a fuel cell.

Of course, preparation of the materials is not limited to these methods.

The experiments described above show that, as the loading of platinum is decreased on all of the support materials studied, the ignition potential for the oxygen reduction reaction initially remains constant. However below a certain critical thickness ($d_{crit}$) the ignition potential starts to decrease (i.e. the over potential for the oxygen reduction reaction starts to increase, and the electrodes become less active for the oxygen reduction reaction). At high loadings of platinum, the ignition potential is similar to a bulk platinum electrode. This suggests a core-shell model structure, where enough Pt atoms are in contact to behave as the bulk metal. When the ignition potential starts to decrease this is due to the platinum film starting to break up into discrete particles.

The anatase form of titanium oxide allows the loading of platinum to be reduced further than on amorphous titanium oxide before the oxygen reduction behaviour shifts away from the bulk behaviour. This occurs below approximately 5 ML equivalent thickness of Pt.

As tin is added to the anatase titanium oxide, initially $d_{crit}$ (the critical minimum thickness at which bulk Pt like activity is achieved) increases, i.e. higher loadings of platinum are needed to achieve bulk platinum like activity. However when the tin content reaches approximately 24 at. % (on a metal basis), bulk platinum like oxygen reduction activity is seen down to approximately 3.2 ML equivalent thickness of Pt and is only slightly altered at 1.6 ML. This suggests that tin doping helps to increase the wetting of the platinum on the surface of the oxide allowing more complete films of platinum to be produced down to these reduced loadings (i.e. a core-shell structure). The activity of the electrodes with above 24 at. % Sn doping is retained after limited accelerated stability cycling, suggesting that the platinum does not restructure under electrochemical control.

The stability of the materials described in this application is such as to render them effective for use in a fuel cell.

Films of the tin doped titanium oxide appeared visually stable after 24 hours of exposure to 0.1 M $H_2SO_4$ at 80° C. up to approximately 30 at. % Sn. Compositional analysis confirmed some loss in Sn above 28 at. % Sn. This suggests that between approximately 24 and 28 at. % Sn, core-shell catalysts can be produced which have a high activity for the oxygen reduction reaction at very low loadings of platinum, with supports that are stable both in an electrochemical environment and under acidic conditions at 80° C.

REFERENCES

1. Peuckert, M., et al., Oxygen Reduction on Small Supported Platinum Particles. Journal of The Electrochemical Society, 1986. 133(5): p. 944-947.
2. Guerin, S., et al., Combinatorial Electrochemical Screening of Fuel Cell Electrocatalysts. Journal of Combinatorial Chemistry, 2003. 6(1): p. 149-158.
3. Gasteiger, H. A., et al., Activity benchmarks and requirements for Pt, Pt-alloy, and non-Pt oxygen reduction catalysts for PEMFCs. Applied Catalysis B: Environmental, 2005. 56(1-2): p. 9-35.
4. Xu, Z., et al., Effect of particle size on the activity and durability of the Pt/C electrocatalyst for proton exchange membrane fuel cells. Applied Catalysis B: Environmental, 2012. 111-112(0): p. 264-270.

5. de Bruijn, F. A., V. A. T. Dam, and G. J. M. Janssen, Review: Durability and Degradation Issues of PEM Fuel Cell Components. Fuel Cells, 2008. 8(1): p. 3-22.
6. Huang, S.-Y., et al., Development of a Titanium Dioxide-Supported Platinum Catalyst with Ultrahigh Stability for Polymer Electrolyte Membrane Fuel Cell Applications. Journal of the American Chemical Society, 2009. 131(39): p. 13898-13899.
7. Hayden, B. E., et al., The influence of support and particle size on the platinum catalysed oxygen reduction reaction. Physical Chemistry Chemical Physics, 2009. 11(40): p. 9141-9148.
8. Huang, S.-Y., P. Ganesan, and B. N. Popov, Electrocatalytic activity and stability of niobium-doped titanium oxide supported platinum catalyst for polymer electrolyte membrane fuel cells. Applied Catalysis B: Environmental, 2010. 96(1-2): p. 224-231.
9. Antolini, E. and E. R. Gonzalez, Ceramic materials as supports for low-temperature fuel cell catalysts. Solid State Ionics, 2009. 180(9-10): p. 746-763.
10. Chen, Y., et al., Atomic layer deposition assisted Pt—SnO2 hybrid catalysts on nitrogen-doped CNTs with enhanced electrocatalytic activities for low temperature fuel cells. International Journal of Hydrogen Energy, 2011. 36(17): p. 11085-11092.
11. Cui, X., et al., Graphitized mesoporous carbon supported Pt—SnO2 nanoparticles as a catalyst for methanol oxidation. Fuel, 2010. 89(2): p. 372-377.
12. Guo, D.-J. and J.-M. You, Highly catalytic activity of Pt electrocatalyst supported on sulphated SnO2/multi-walled carbon nanotube composites for methanol electro-oxidation. Journal of Power Sources, 2012. 198(0): p. 127-131.
13. Ye, J., et al., Preparation of Pt supported on WO3-C with enhanced catalytic activity by microwave-pyrolysis method. Journal of Power Sources, 2010. 195(9): p. 2633-2637.
14. Weidner, J. W. and B. L. Garcia, Electrocatalyst support and catalyst supported thereon US 2009/0065738 A1, 2009: United States.
15. Cai, M., et al., Electrocatalyst Supports for Fuel Cells US 2007/0037041 A1, 2007: United States.
16. Do, T. B., M. Cai, and M. S. Ruthkosky, Mesoporous electrically conductive metal oxide catalyst supports WO 2009/152003 A2, 2009.
17. Adzic, R., J. Zhang, and M. Vukmirovic, Electrocatalyst for oxygen reduction with reduced platinum oxidation and dissolution rates US 2006/0263675 A1, 2006: United States.
18. Adzic, R., M. Vukmirovic, and K. Sasaki, Synthesis of metal-metal oxide catalysts and electrocatalysts using a metal cation adsorption/reduction and adatom replacement by more noble ones U.S. Pat. No. 7,704,918 B2, 2010: United States.
19. Batzill, M. and U. Diebold, The surface and materials science of tin oxide. Progress in Surface Science, 2005. 79(2-4): p. 47-154.
20. Hartl, K., et al., AuPt core-shell nanocatalysts with bulk Pt activity. Electrochemistry Communications, 2010. 12(11): p. 1487-1489.
21. Ma, Y., et al., High active PtAu/C catalyst with core-shell structure for oxygen reduction reaction. Catalysis Communications, 2010. 11(5): p. 434-437.
22. Sasaki, K., et al., Core-Protected Platinum Monolayer Shell High-Stability Electrocatalysts for Fuel-Cell Cathodes. Angewandte Chemie International Edition, 2010. 49(46): p. 8602-8607.
23. Shuangyin, W., et al., Controlled synthesis of dendritic Au@Pt core-shell nanomaterials for use as an effective fuel cell electrocatalyst. Nanotechnology, 2009. 20(2): p. 025605.
24. Silva, J. C. M., et al., Ethanol oxidation reactions using SnO2@Pt/C as an electrocatalyst. Applied Catalysis B: Environmental, 2010. 99(1-2): p. 265-271.
25. Wang, R., et al., Carbon supported Pt-shell modified PdCo-core with electrocatalyst for methanol oxidation. International Journal of Hydrogen Energy, 2010. 35(19): p. 10081-10086.
26. Wang, R., et al., Preparation of carbon-supported core@shell PdCu@PtRu nanoparticles for methanol oxidation. Journal of Power Sources, 2010. 195(4): p. 1099-1102.
27. Wang, W., et al., Pt overgrowth on carbon supported PdFe seeds in the preparation of core-shell electrocatalysts for the oxygen reduction reaction. Journal of Power Sources, 2010. 195(11): p. 3498-3503.
28. Wei, Z. D., et al., Electrochemically synthesized Cu/Pt core-shell catalysts on a porous carbon electrode for polymer electrolyte membrane fuel cells. Journal of Power Sources, 2008. 180(1): p. 84-91.
29. Wu, Y.-N., et al., High-performance core-shell PdPt@Pt/C catalysts via decorating PdPt alloy cores with Pt. Journal of Power Sources, 2009. 194(2): p. 805-810.
30. Lopez, M., et al., Core/Shell-type catalyst particles comprising metal or ceramic core materials and methods for their preparation, WO2008/025751. 2008.
31. Guerin, S. and B. E. Hayden, Physical Vapor Deposition Method for the High-Throughput Synthesis of Solid-State Material Libraries. Journal of Combinatorial Chemistry, 2006. 8(1): p. 66-73.
32. Guerin, S., et al., High-Throughput Synthesis and Screening of Ternary Metal Alloys for Electrocatalysis. The Journal of Physical Chemistry B, 2006. 110(29): p. 14355-14362.
33. International Centre for Diffraction Data Database no. 41-1445, 2010.
34. Hayden, B. E., et al., The influence of Pt particle size on the surface oxidation of titanium dioxide supported platinum. Physical Chemistry Chemical Physics, 2009. 11(10): p. 1564-1570.

The invention claimed is:

1. A core-shell catalyst consisting of a core particle and shell catalyst, wherein said core particle has a diameter of from 10-50 nm and comprises a mixed metal oxide material of tin and titanium, and wherein said shell catalyst comprises 1 to 10 monolayers of a catalyst material.

2. The core-shell catalyst of claim 1, wherein the catalyst material comprises platinum or platinum alloy.

3. The core-shell catalyst of claim 2, wherein the mixed metal oxide material comprises at least 15 atomic % tin, based on metal content.

4. The core-shell catalyst of claim 3, wherein the mixed metal oxide material comprises at least 15 atomic % tin and not more than approximately 80 atomic % titanium, based on metal content.

5. The core-shell catalyst of claim 4, wherein the mixed metal oxide material comprises up to 40 atomic % tin, based on metal content.

6. The core-shell catalyst of claim 5, wherein the shell catalyst consists of approximately 1-10 monolayers of platinum or platinum alloy.

7. The core-shell catalyst of claim 6, wherein the shell catalyst consists of approximately 1-5 monolayers of platinum or platinum alloy.

8. The core-shell catalyst of claim 7, wherein the shell catalyst consists of approximately 1.5-5 monolayers of platinum or platinum alloy.

9. The core-shell catalyst of claim 6, wherein the titanium oxide is anatase titanium oxide.

10. The core-shell catalyst of claim 6, wherein the shell catalyst consists of approximately 1-10 monolayers of platinum.

11. The core-shell catalyst of claim 3, wherein the mixed metal oxide material comprises between 24 and 28 atomic % tin.

12. The core-shell catalyst of claim 4, wherein the mixed metal oxide material comprises between 24 and 28 atomic % tin and between 72 and 76 atomic % titanium.

13. The core-shell catalyst of claim 12, wherein the core particle consists of the mixed metal oxide.

14. The core-shell catalyst of claim 13, wherein the shell catalyst consists of approximately 1-10 monolayers of platinum or platinum alloy.

15. The core-shell catalyst of claim 14, wherein the shell catalyst consists of approximately 1-5 monolayers of platinum or platinum alloy.

16. The core-shell catalyst of claim 15, wherein the shell catalyst consists of approximately 1.5-5 monolayers of platinum or platinum alloy.

17. The core-shell catalyst of claim 14, wherein the titanium oxide is anatase titanium oxide.

18. The core-shell catalyst of claim 14, wherein the shell catalyst consists of approximately 1-10 monolayers of platinum.

19. The core-shell catalyst of claim 12, wherein the shell catalyst consists of approximately 1-10 monolayers of platinum or platinum alloy.

20. The core-shell catalyst of claim 19, wherein the shell catalyst consists of approximately 1-5 monolayers of platinum or platinum alloy.

21. The core-shell catalyst of claim 20, wherein the shell catalyst consists of approximately 1.5-5 monolayers of platinum or platinum alloy.

22. The core-shell catalyst of claim 19, wherein the titanium oxide is anatase titanium oxide.

23. The core-shell catalyst of claim 19, wherein the shell catalyst consists of approximately 1-10 monolayers of platinum.

24. The core-shell catalyst of claim 1, wherein the titanium is crystalline titanium oxide.

25. The core-shell catalyst of claim 24, wherein the crystalline titanium oxide is anatase titanium oxide.

26. A fuel cell comprising the core-shell catalyst of claim 1.

27. A method of producing a core-shell catalyst, the method comprising: forming a core particle having a diameter of from 10-50 nm and comprising a mixed metal oxide material of tin and titanium; and forming a catalytic shell layer comprising 1 to 20 monolayers of a catalyst material on the mixed metal oxide material.

28. The method of claim 27, wherein the mixed metal oxide material comprises at least 15 atomic % tin and not more than approximately 80 atomic % titanium, based on metal content; and wherein the shell layer consists of 1-10 monolayers of platinum or platinum alloy.

29. The method of claim 28, wherein the mixed metal oxide material comprises up to 40 atomic % tin, based on metal content.

30. The method of claim 29, wherein the mixed metal oxide material comprises between 24 and 28 atomic % tin and between 72 and 76 atomic % titanium.

31. The method of claim 30, wherein the shell layer consists of 1.5-5 monolayers of platinum or platinum alloy.

32. The method of claim 29, wherein the titanium is anatase titanium oxide.

33. The fuel cell of claim 26, wherein the mixed metal oxide material comprises at least 15 atomic % tin and not more than approximately 80 atomic % titanium, based on metal content; and wherein the shell catalyst consists of 1-10 monolayers of platinum or platinum alloy.

34. The fuel cell of claim 33, wherein the mixed metal oxide material comprises up to 40 atomic % tin, based on metal content.

35. The fuel cell of claim 34, wherein the core particle consists of the mixed metal oxide of tin and titanium, wherein the tin is between 24 and 28 atomic % and the titanium is between 72 and 76 atomic %, based on metal content.

* * * * *